(12) United States Patent
Kliger et al.

(10) Patent No.: US 8,174,999 B2
(45) Date of Patent: *May 8, 2012

(54) HOME NETWORK SYSTEM AND METHOD

(75) Inventors: Avi Kliger, Givatayim (IL); Rami Kopelman, Lexington, MA (US); Nachum Avishay, Rehovot, IL (US); Alon Shtern, Magshimim (IL); Amir Wasserman, Kiriat Ono (IL)

(73) Assignee: Broadcom Corporation, Irvine, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/435,582

(22) Filed: May 5, 2009

(65) Prior Publication Data

US 2009/0217325 A1 Aug. 27, 2009

Related U.S. Application Data

(63) Continuation of application No. 09/943,424, filed on Aug. 30, 2001.

(60) Provisional application No. 60/229,263, filed on Aug. 30, 2000, provisional application No. 60/230,110, filed on Sep. 5, 2000, provisional application No. 60/275,060, filed on Mar. 12, 2001, provisional application No. 60/291,130, filed on May 15, 2001, provisional application No. 60/297,304, filed on Jun. 11, 2001.

(51) Int. Cl.
*H04L 12/26* (2006.01)
*H04L 12/28* (2006.01)
*H04J 3/16* (2006.01)

(52) U.S. Cl. ......... 370/252; 370/356; 370/401; 370/468
(58) Field of Classification Search .......... 370/351–356, 370/466, 442, 485, 252, 401, 468
See application file for complete search history.

(56) References Cited

U.S. PATENT DOCUMENTS

| 3,836,888 A | 9/1974 | Boenke et al. |
| 4,413,229 A | 11/1983 | Grant |
| 4,536,875 A | 8/1985 | Kume et al. |
| 4,608,685 A * | 8/1986 | Jain et al. ............... 370/352 |
| 4,893,326 A | 1/1990 | Duran et al. |
| 5,052,029 A | 9/1991 | James et al. |

(Continued)

FOREIGN PATENT DOCUMENTS

EP 0 385695 9/1990

(Continued)

OTHER PUBLICATIONS

Multichannel News, MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

(Continued)

*Primary Examiner* — Steven H Nguyen
(74) *Attorney, Agent, or Firm* — Weiss & Arons LLP

(57) ABSTRACT

A home network, in one embodiment including a home wiring system; a demarcation point unit in electrical communication with the home wiring system; and a home network module in electrical communication with the home wiring system. The home network module is adapted for connection to a home electronic device. The demarcation point unit passes data to and receives data from the home electronic device through the home network module.

25 Claims, 20 Drawing Sheets

U.S. PATENT DOCUMENTS

| | | |
|---|---|---|
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A * | 6/2000 | Petler .................. 370/356 |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 * | 5/2001 | Bell .................. 370/466 |
| 6,243,413 B1 | 6/2001 | Beukema |
| 6,304,552 B1 | 10/2001 | Chapman et al. |
| 6,307,862 B1 * | 10/2001 | Silverman .................. 370/442 |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 * | 8/2004 | Bell .................. 370/468 |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 * | 5/2005 | Cheng et al. .................. 370/480 |
| 6,930,989 B1 | 8/2005 | Jones, IV et al. |
| 6,940,833 B2 | 9/2005 | Jonas et al. |
| 6,950,399 B1 * | 9/2005 | Bushmitch et al. .......... 370/236 |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,606,256 B2 | 10/2009 | Vitebsky |
| 7,652,527 B2 | 1/2010 | Ido et al. |
| 7,653,164 B2 | 1/2010 | Lin et al. |
| 7,675,970 B2 | 3/2010 | Nemiroff et al. |
| 7,783,259 B2 | 8/2010 | Dessert et al. |
| 7,817,642 B2 | 10/2010 | Ma et al. |
| 7,916,756 B2 | 3/2011 | Atsumi et al. |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0136231 A1 | 9/2002 | Leathurbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037589 A1 | 2/2008 | Kliger |
| 2008/0080369 A1 | 4/2008 | Sumioka et al. |
| 2008/0089268 A1 | 4/2008 | Kinder et al. |
| 2008/0117919 A1 | 5/2008 | Kliger |
| 2008/0117929 A1 | 5/2008 | Kliger |
| 2008/0130779 A1 | 6/2008 | Levi |

| | | |
|---|---|---|
| 2008/0178229 A1 | 7/2008 | Kliger |
| 2008/0189431 A1 | 8/2008 | Hyslop et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0273591 A1 | 11/2008 | Brooks et al. |
| 2008/0279219 A1 | 11/2008 | Wu et al. |
| 2008/0298241 A1 | 12/2008 | Ohana |
| 2009/0092154 A1 | 4/2009 | Malik et al. |
| 2009/0122901 A1 | 5/2009 | Choi et al. |
| 2009/0165070 A1 | 6/2009 | McMullin et al. |
| 2009/0254794 A1 | 10/2009 | Malik et al. |
| 2009/0257483 A1 | 10/2009 | French et al. |
| 2009/0279643 A1 | 11/2009 | Shusterman |
| 2009/0316589 A1 | 12/2009 | Shafeeu |
| 2010/0031297 A1 | 2/2010 | Klein |
| 2010/0080312 A1 | 4/2010 | Moffatt et al. |
| 2010/0150016 A1 | 6/2010 | Barr |
| 2010/0158013 A1 | 6/2010 | Kliger |
| 2010/0158015 A1 | 6/2010 | Wu |
| 2010/0158021 A1 | 6/2010 | Kliger |
| 2010/0158022 A1 | 6/2010 | Kliger |
| 2010/0174824 A1 | 7/2010 | Aloni et al. |
| 2010/0185731 A1 | 7/2010 | Wu |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0310907 A1 | 12/2011 | Klein et al. |

FOREIGN PATENT DOCUMENTS

| | | |
|---|---|---|
| EP | 0 622926 | 11/1994 |
| EP | 1501326 | 1/2005 |
| EP | 1501326 A1 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27253 dated Dec. 30, 2003 (4 pgs.).

International Search Report for International Application No. PCT/US03/27254 dated Feb. 3, 2004 (5 pgs.).

U.S. Patent and Trademark Office Action mailed Dec. 23, 2008 in U.S. Appl. No. 09/943,424.

"Home Networking on Coax for Video and Multimedia, Overview for IEEE 802.1AVB", Shlomo Ovadia, San Ramon/California, May 30, 2007.

"MoCA: Ubiquitous Multimedia Networking in the Home, Proc of SPIE vol. 6776 67760C-1", Shlomo Ovadia, SPIE, Bellingham, WA, May 28, 2010.

"Microtune Introduces Industry's First 1-GHZ Cable Tuners Compatible with MoCA—Home Networking Standard", Business Wire, San Francisco, California, Mar. 19, 2007.

\* cited by examiner

Ⓒ AFTER REGISTRATION PERIOD, THE FOLLOWING MASTER BURST STARTS THE ACK CYCLE WITH ITS ACK BURST.

Ⓑ AFTER ACK CYCLE, THE FOLLOWING MASTER UBR BURST (CONSIDERING THE CBR, UBR PRIORITY) MARKS THE START OF THE FAIRNESS CYCLE WITH FAIRN_START_BURST.

Ⓐ EACH TRANSMISSION CYCLE STARTS WITH A MASTER CBR BURST -CYCLE START BURST

HOME NETWORK SYSTEM AND METHOD

RELATED APPLICATIONS

This application is a continuation application of U.S. patent application Ser. No. 09/943,424 filed on Aug. 30, 2001 entitled "Home Network System and Method". The application Ser. No. 09/943,424 claims the benefit of the filing date of U.S. Provisional Application Ser. No. 60/229,263, filed Aug. 30, 2000, entitled "Home Network Method And Apparatus," and Provisional Application Ser. No. 60/230,110, filed Sep. 5, 2000, entitled "Home Network Method And Apparatus." The 09/943,424 application further claims the benefit of the filing date of U.S. Provisional Application Ser. No. 60/275,060, filed Mar. 12, 2001, entitled "Home Network Uses Frequencies Above CaTV," and Provisional Application Ser. No. 60/291,130, filed May 15, 2001, entitled "Home Network Method And Apparatus," and Provisional Application Ser. No. 60/297,304, filed Jun. 11, 2001, entitled "Home Network Uses Frequencies Above CaTV," the entirety of which applications is incorporated by reference herein.

FIELD OF THE INVENTION

The invention relates to communication networks in general and more specifically to networks suitable for use in residential buildings.

BACKGROUND OF THE INVENTION

As the number of electronic devices in the home has increased there has been a demand for a way to permit those devices to communicate between themselves and with external networks. Several standards are evolving protocols that will permit devices to communicate over twisted pair and other wiring modalities.

However, a large number of homes are presently equipped with coaxial cable to permit the viewing of cable television programming or to permit connection of computer devices to the internet. The evolving standards do not appear to take into account this installed base of coaxial cable. Instead, such standards require the rewiring of homes, in order to comply with the evolving protocol, or the use of other existing media, such as power lines, telephone lines, or wireless links. In comparison to coaxial cables, however, such existing media supports a significantly lower bit rate.

This invention meets this demand for interconnectivity without the necessity of changing the physical wiring present in the home.

SUMMARY OF THE INVENTION

The invention relates to a home network. In one aspect, the invention features a home network including a network backbone, a plurality of modules connected to the network backbone, and a demarcation point unit. Each module is connected between the network backbone and a local bus. The demarcation point unit receives a home network signal from one of the modules over the network backbone and returns the home network signal to the plurality of modules. The network backbone includes a plurality of coaxial cables and, in one embodiment, a splitter.

A module is in communication with a plurality of local buses. Embodiments of the local bus include a 1394 local bus, a universal serial bus (USB), Ethernet bus, Internet protocol (IP) bus. In one embodiment, at least two of the modules are in communication with 1394 local bus.

The demarcation point unit is in communication with an external network and receives a cable TV (CaTV) signal from the external network. The CaTV and the home network signals pass together over the network backbone to the modules. In one embodiment, the frequency of the home network signal is approximately in the 960-1046 MHz frequency range. A device in communication with the demarcation point unit can receive the CaTV signal directly without passing through a module.

The demarcation point unit includes a signal reflector unit. In one embodiment, the signal reflector unit that receives the home network signal from one module—the home network signal is at a first frequency. The signal reflector unit returns the home network signal to the plurality of modules of the home network signal having a second frequency. The first frequency can be the same as or different (e.g., higher or lower) than the second frequency.

In another aspect, the invention features a home network including a demarcation point unit and a plurality of modules. The demarcation point unit receives a signal from a network that is external to the home. Each of plurality of modules is connected to the demarcation point unit by one or more coax cables and to a device by a local bus. One of the modules receives a message from the device connected to that one module by the corresponding local bus and transmits the message to the demarcation point unit. The demarcation point unit receives the message from that one module and transmits the message and the signal together to each of the plurality of modules over the coax cables.

In yet another aspect, the invention features a demarcation point unit that connects a home network and an external network. The demarcation point unit includes a diplexer that receives a first signal from the home network and a second signal from the external network. The diplexer separates the first signal from the second signal. A signal reflector unit receives the separated first signal from the diplexer and returns the first signal to the diplexer for transmission to the home network.

In one embodiment, the signal reflector unit includes a coax cable that reflects the first signal received from the diplexer back to the diplexer. The coax cable of the signal reflector unit can be shorted to ground or unterminated. In another embodiment, the signal reflector unit includes a delay line in communication with the diplexer. The other end of the delay is shorted to ground or unterminated.

The signal converter unit in another embodiment includes a RF converter that changes a frequency of the first signal before the first signal returns to the diplexer. The signal passing to the diplexer from the home network is an upstream signal. The signal returning to the diplexer from the signal reflector unit is a downstream signal. The signal reflector unit includes a second diplexer having an input/output (I/O) in communication with a first diplexer and an input in communication with the RF converter. The second diplexer separates the upstream signal received by the I/O from the downstream signal received by the input. The second diplexer returns the downstream signal to the first diplexer over the I/O.

An output in communication with the RF converter passes the upstream signal to the RF converter over the output. The RF converter includes a RF down-converter in communication with a RF up-converter. The RF down-converter changes the frequency of the upstream signal to an intermediate frequency. The RF up-converter changes the intermediate frequency to the frequency of the downstream signal. In one embodiment, the frequency of the upstream signal is higher than the frequency of the first signal. Also, the power level of the upstream signal received at the signal reflector unit is constant, and the power level of the downstream signal leaving the signal reflector unit is also constant.

In the signal reflector, a splitter can be connected between the diplexer and the home network. The splitter receives the downstream signal from the diplexer and transmits the returned downstream signal to the home network over a plurality of coax cables. The splitter receives the upstream signal from the home network for transmission to the diplexer. The diplexer combines the first signal received from the signal reflector unit with the signal received from the external network and transmits the combined signal to the home network.

In another aspect, the invention features a network module that connects a network backbone to a local bus. The network module includes a diplexer that receives an analog signal and separates a home network signal from the analog signal. A modem converts the home network signal to a digital signal. A media access controller (MAC) interfaces with a protocol of the local bus to deliver the digital signal to the local bus.

In another aspect, the invention features a method for use by modules in a home network for communicating with each other over a coax backbone. A cycle start burst is transmitted over the backbone to start a transmission cycle during which the network modules transmit bursts over the backbone. A first portion of the transmission cycle is allocated for the transmission of isochronous bursts by the network modules. A second portion of the transmission cycle is allocated for the transmission of asynchronous bursts by the network modules.

A transmission order is established for the network modules to follow when transmitting isochronous and asynchronous bursts over the backbone. The cycle start burst includes the transmission order. Isochronous bursts start at the start of every transmission cycle, followed by the transmission of asynchronous bursts. Transmission of an asynchronous burst is allowed to complete after the end of the transmission cycle.

In one embodiment, those network modules that are requesting bandwidth for transmitting isochronous bursts are determined. One of the modules is designated to be a master network module, which transmits the cycle start burst. The network modules synchronize to the cycle start burst.

In another embodiment, bandwidth is allocated in the first portion of the transmission cycle to each network module requesting a guaranteed quality of service. Asynchronous bursts are monitored, by a given network module, on the backbone to determine when a given network module can transmit an asynchronous burst. The given network module receives a grant over the backbone to indicate that the given network module can transmit an asynchronous burst.

In another embodiment, isochronous bursts are monitored by a given network module on the backbone to determine when that network module can transmit an isochronous burst. An empty burst is transmitted by a given network module if the given network module has no data to transmit during the second portion of the transmission cycle.

BRIEF DESCRIPTION OF THE DRAWINGS

The invention is pointed out with particularity in the claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction with the accompanying drawings, in which:

DETAILED DESCRIPTION

Figure 1:
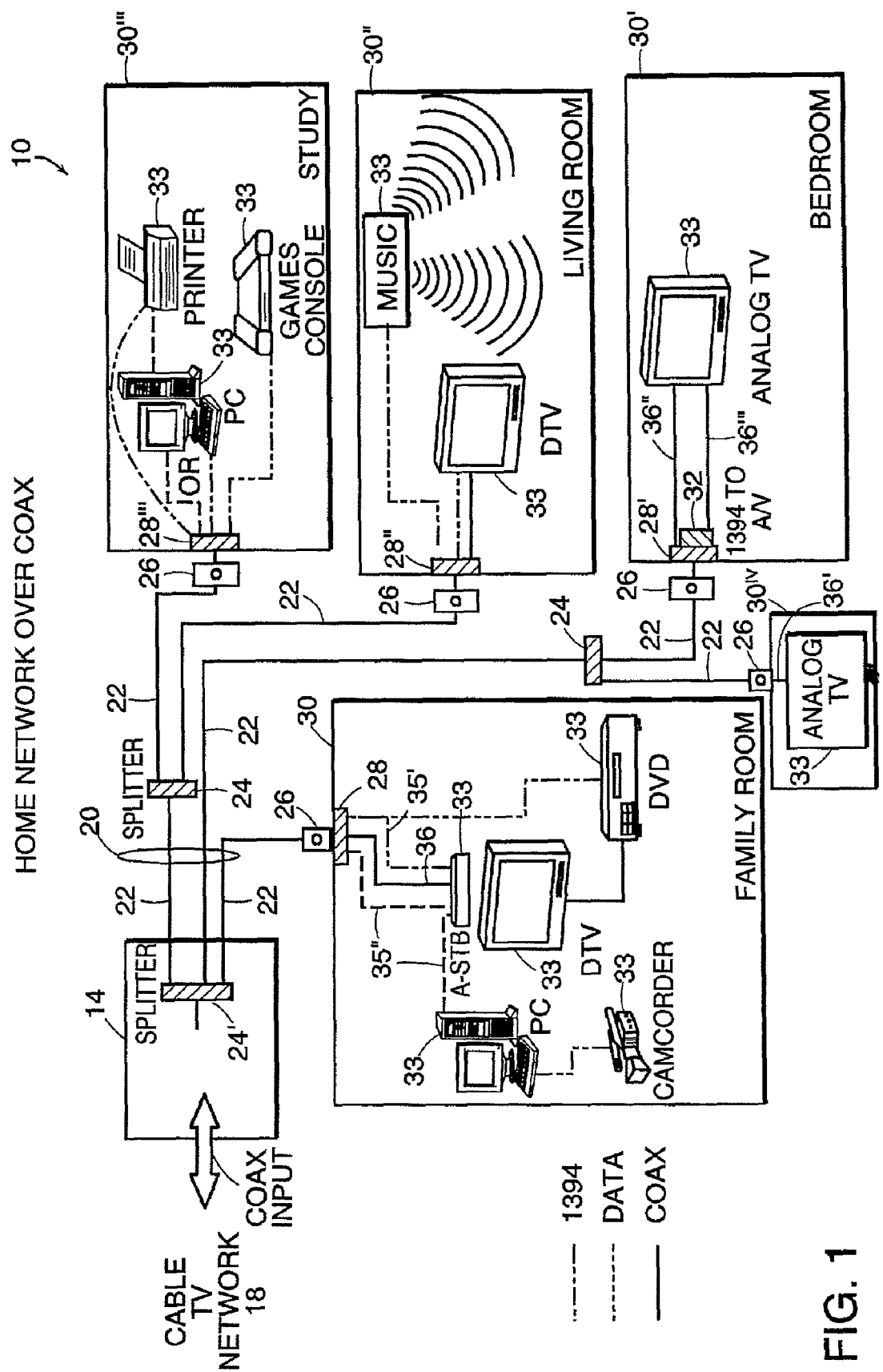
FIG. 1 is a block diagram of an embodiment of a home network system constructed in accordance with the invention.

In brief overview, FIG. 1 shows an embodiment of a home network 10, constructed in accordance with the invention, including a demarcation point unit (DPU) 14 located at the entry point into a home, which operates as the interface between the home network 10 and an external network 18, such as a cable television (TV) network or the Internet. The DPU 14 is in communication with a plurality of home-network modules (HNM) 28, 28', 28", 28''' (generally 28), each located in one of various rooms of the home. Each HNM 28 is the interface between devices in a room (e.g., home entertainment devices and computer devices) and the DPU 14.

Implementing the home network 10 in the home does not require the rewiring of the cable TV equipment that is typically already installed in many homes for accessing the cable TV network 18 or the Internet. The HNMs 28 communicate with the DPU 14 and with each other over standard cable equipment. Such cable equipment includes coaxial (or coax) cables 22, splitters (generally 24), and cable TV outlets 26. This installed cable equipment operates as a backbone of the home network 10 for conveying intra-room communications. Although the home network 10 can operate with existing coax wiring, the principles of the invention apply also to other types of wiring, such as CAT-5 or plastic fiber. In general, the home network 10 operates in parallel to the cable TV services, leaving legacy cable TV signals and devices (such as set top boxes and cable modems) unaffected.

With this existing coax cable equipment, the home network 10 joins various computer devices, such as personal computers and peripherals (printer, scanner, CD etc.), and entertainment equipment, such as set top boxes (STB), televisions, videocassette recorders, personal video recorder (PVR), etc, located throughout the home into one network. By this one network, various computer devices in different rooms can share access to the Internet, and video or audio sources played in one room can be enjoyed in another room of the home. In one embodiment, described in more detail below, the existing cable equipment provides an intra-room backbone for an IEEE-1394 (FireWire) network.

More specifically, in an exemplary embodiment of the home network 10, HNMs 28, 28', 28'', 28''' in respective rooms 30, 30', 30'', 30''' (generally 30) are connected to the home network backbone through cable TV outlets 26. The home network backbone (referred to hereafter as backbone 20), includes a plurality of coax cables 22 that connect the cable TV outlets 26, and thus the HNMs 28, to the DPU 14. The coax cables 22 connect to the splitters 24, which distribute the signals received from the external network 18 and from the HNMs 28 to each of the rooms 30 connected to the home network 10. In the embodiment shown in FIG. 1, the DPU 14 includes one of the splitters 24'; in another embodiment, instead of being part of the DPU 14, that splitter 24' is connected to an output of the DPU 14. In some embodiments, a residential gateway device is located at the demarcation point (i.e., the entry point of the coax cable to the home) to exchange signals between the external network 18 and other devices in the house, such as a cable modem or a STB. Embodiments of the residential gateway provide Internet access (e.g., cable modem, digital subscriber line (DSL)). Other embodiments provide the functionality of a set top box, of a personal video recorder, or of a tuner for multiprogramming. In each of these embodiments, the DPU 14 can be integrated into or be external to such the residential gateway device.

Each room 30 includes one or more devices 33. Devices 33 include, for example, digital video disc (DVD) players, videocassette recorders (VCR), game consoles, interactive televisions computers, scanners, fax machines, printers, analog televisions, digital televisions, set top boxes, stereo systems, and camcorders. In each room 30 having a device 33 that the resident of the home wants to make available for intra-room communication, there is located a HNM 28 that connects that device 33 to the backbone 20. For example, rooms 30, 30', 30'', and 30''' each have devices 33 that the resident chooses to have intra-room communication capability; so, in each of these rooms an HNM 28 connects those devices 33 to the backbone 20

Devices 33 within a given room 30 that communicate according to the same protocol (e.g., USB (universal serial bus), IP (Internet Protocol), Ethernet, and IEEE-1394) are typically connected to the same local bus 35. Each HNM 28 can interface with one or more different types of local buses (generally 35). For example, in room 30 the HNM 28 interfaces with a local 1394-bus 35', connected to an analog set-top box and a DVD player, and a local data-bus 35'' (e.g., Ethernet, USB, IP), connected to analog set-top box and a personal computer. In one embodiment, devices 33 in different rooms of the same local bus type (e.g., 1394) can communicate with each other over the backbone 20, whereas devices 33 of different local bus types (e.g., 1394 and USB) do not. In some embodiments, the HNM 28 resides in the entertainment or data device, in other embodiments, the HNM 28 resides in a separate box.

In addition to the various types of local buses 35, the HNM 28 can connect to other devices 33 in the room 30 by coax cable. For example, the HNM 28 in room 30 also connects to the analog set-top box by coax cable 36. Although shown in FIG. 1 to be separate from the analog set-top box, in one embodiment the HNM 28 is a built-in component of the set-top box.

Each HNM 28 communicates with the DPU 14 and each other HNM 28 on the backbone 20 with analog signals and converts analog signals received from the DPU 14 and the HNMs 28 into digital signals for delivery to devices 33 connected to that HNM 28. If a room 30 has a legacy device 33 requiring an analog signal (such as an analog or digital TV), but does not have a set-top box, an interface box can convert the digital signal produced by the HNM 28 into a signal that is appropriate for that legacy device. For example, in room 30', the HNM 28' communicates with the analog TV, which requires an analog signal, through the interface box 32, which converts 1394 digital signals to audio/visual analog signals.

Instead of being on the same local bus 35, devices 33 of the same protocol within a given room 30 can connect to the same HNM 28 by different local buses 35. With this arrangement, such devices 33 can communicate with devices 33 in other rooms 30 of the home.

Devices 33 that the resident does not want to participate in intra-room communication can connect directly to the external network 18 without the use of the HNM 28. For example, in room $30^{iv}$, the analog television set is connected directly to the backbone 20 without an intervening HNM 28. Such devices 33 continue to receive the legacy cable TV signals from the cable TV network or have broadband access to the Internet through the DPU 14.

In operation, each HNM 28 permits those devices 33 connected to that HNM 28 to communicate with other devices 33 in different rooms 30, to receive programming from the cable television, and to have broadband access to the Internet (e.g., through a cable modem, DSL service, and Satellite). For example, a DVD disc playing in the DVD player in room 30 can be viewed on the digital television in room 30'' and that digital television can also receive programming from the cable television network 18. Similarly, computer devices in various rooms can communicate with one another using their respective HNMs 28 connected to the backbone 20. For example, the personal computer (PC) in room 30 can print a document on the printer or share a file with the personal computer in room 30''', or access the Internet through a cable modem (or DSL or audio modem). In accordance with the principles of the invention, the analog signal to and from the Internet (or cable provider) runs over the same coax wires 22 in the house and at the same time as the intra-room communication signals (hereafter the home network signal). In each case, the signal received from the cable television network or Internet provider are routed to the proper electronic devices by way of the DPU 14 and the appropriate HNM 28.

Figure 2:
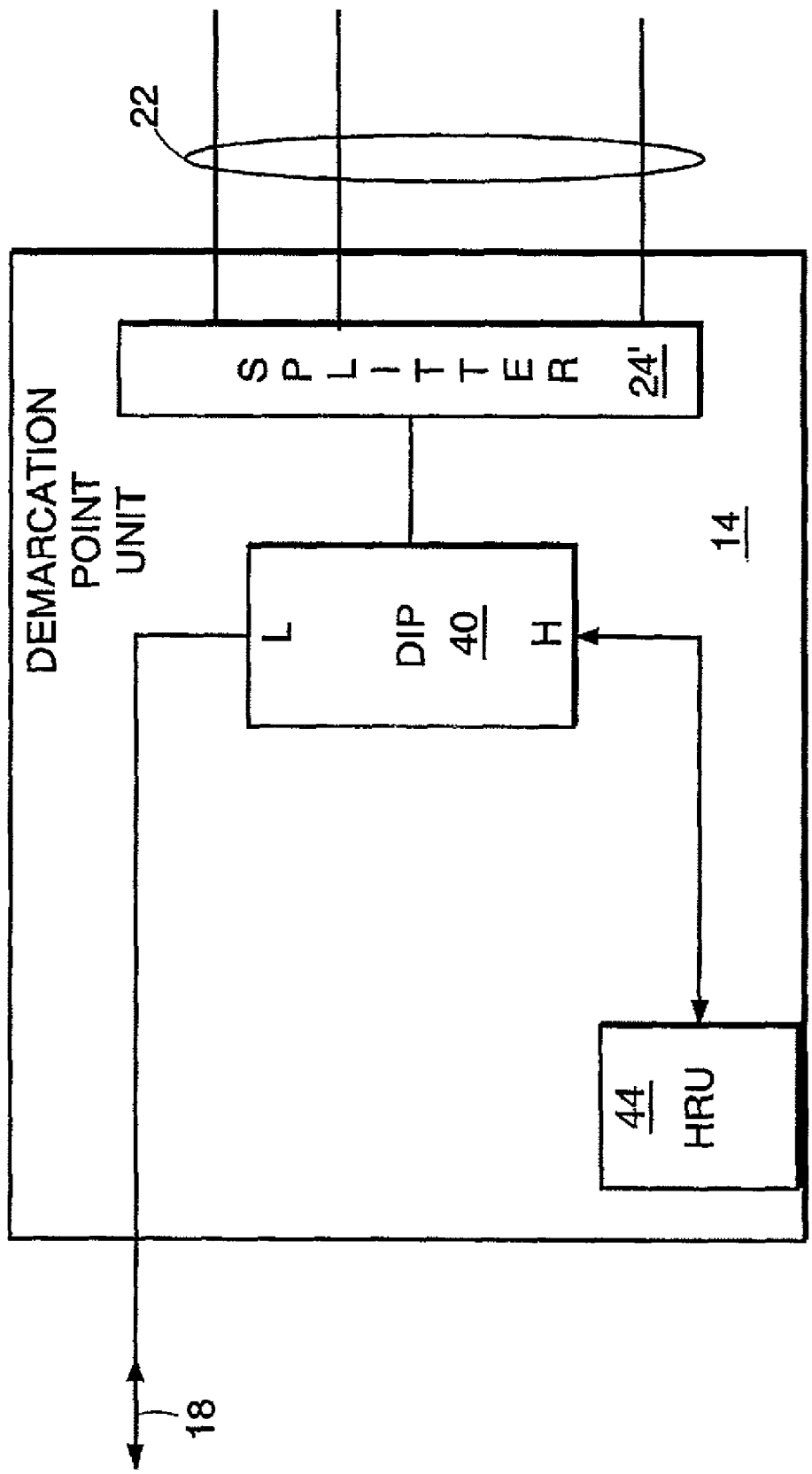
FIG. 2 is a block diagram of an embodiment of a demarcation point unit including a home network reflector unit as shown in FIG. 1.

FIG. 2 shows an embodiment of the DPU 14 including a diplexer 40, a home-network reflector unit (HRU) 44 and a splitter 24''. In general, the diplexer 40 separates a cable TV (CaTV) signal (or satellite signal) received from the external network 18 from a home network signal received from the HNMs 28 connected to the backbone 20. One input/output (I/O) port (the "L" port) of the diplexer 40 transmits and receives the CaTV signal (or satellite signal) to and from the external network 18. Another I/O port (the "H" port) of the diplexer 40 transmits and receives the home network signal to and from HRU 44. The diplexer 40 also combines the CaTV (or satellite) signal received from the external network 18 with the home network signal received from the HRU 44 and passes the combined signal to the splitter 24' through a third I/O port for subsequent transmission to the HNMs 28 over the backbone 20.

The "L" port uses a low-pass filter at a certain predetermined frequency, fc, and the "H" port uses a high-pass filter at the same frequency, fc. By setting the frequency, fc, to about 900 MHz, for example, the low-pass "L" port transfers TV signals (5-860 Mhz), and the high-pass "H" port transfers the home network signal above 860 MHz. More specifically, one embodiment sets the cutoff frequency to 950 MHz to separate frequencies above 950 MHz for use by the home network signal from the CaTV signals, which are in the 5-860 MHz range.

If satellite TV signals are used inside the home, the frequency, fc, is set to about 2100 MHz, to separate the satellite TV signals (950-2100 MHz) from the home network signal (below 950 MHz or above 2100 MHz). In this satellite example, the "L" port is connected to the external network 18 and the "H" port is connected to the HRU 44. Alternatively, the cutoff frequency, fc, is set to about or below 900 MHz, and the home network signal uses frequencies below the satellite TV signals. In this satellite example, the "H" port is connected to the external network 18 and the "L" port is connected to the HRU 44.

In some embodiments, the HRU 44 is either an unterminated or a shorted coaxial cable, which reflects the home network signal received from the diplexer 40 back to the diplexer 40. Some embodiments of a passive HRU connect one port of a passive delay line to the H port of the diplexer 40 to improve the performance of the network 10 by avoiding signal fading. In such embodiments, the other port of the passive delay line is unterminated or shorted. In still other embodiments, leaving an output of the diplexer 40 unterminated or by shorting that output to ground attains reflection of the home network signal. These embodiments of the HRU 44 are referred to as passive HRUs.

Figure 2A:
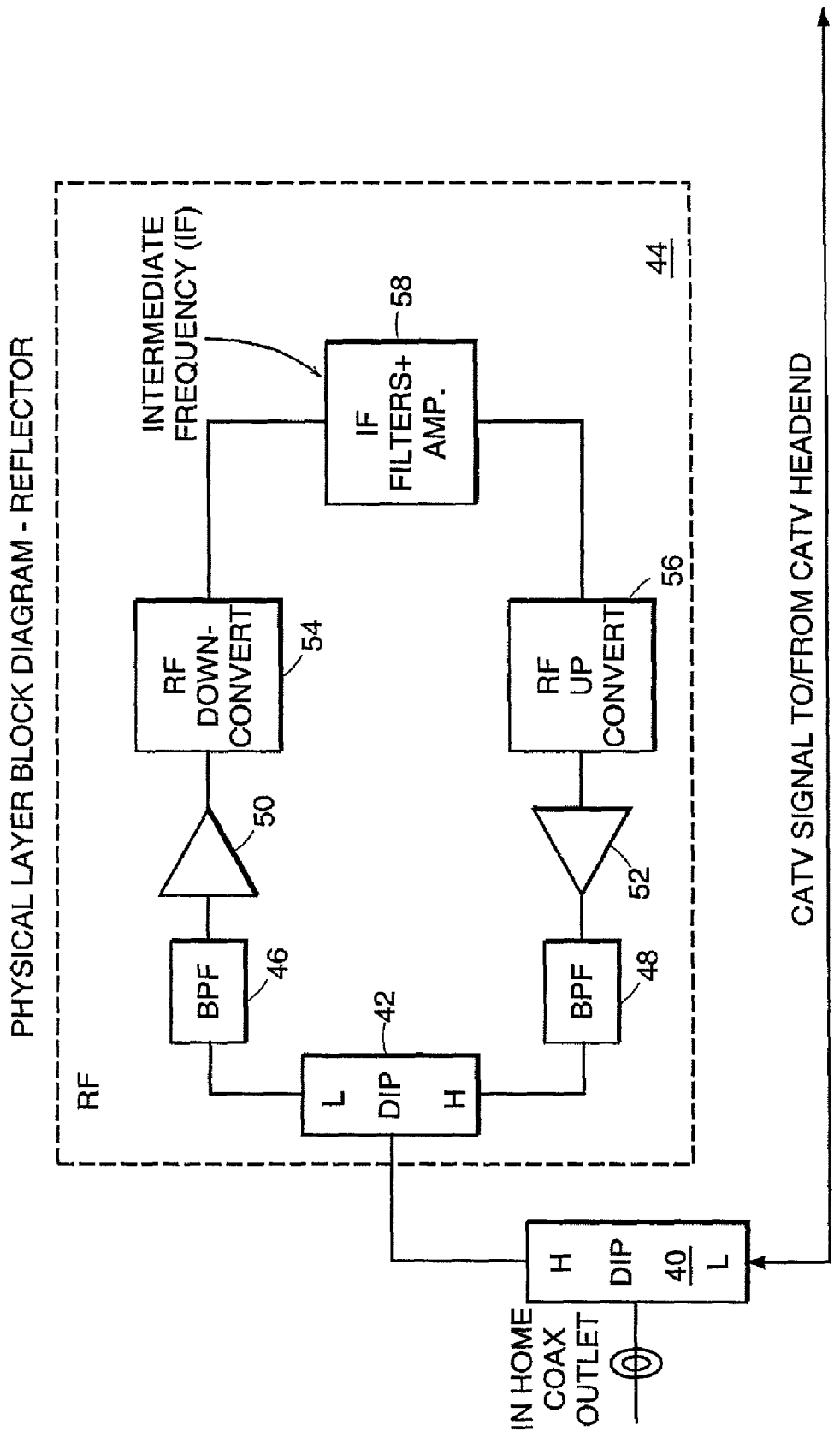
FIG. 2A is a block diagram of another embodiment of the home network reflector unit.

FIG. 2A shows another embodiment of the HRU 44 including a diplexer 42, band pass (BP) filters 46, 48, amplifiers 50, 52, an RF down-converter 54, an RF up-converter 56 and an intermediate frequency filter and amplifier unit 58. The diplexer 42 along with the BP filters 46, 48 separate the upstream signal from the downstream signal. The upstream signal is the signal coming from the backbone 20 to the HRU 44, and downstream signal is the signal returning from the HRU 44 to the backbone 20. The upstream signal coming from a transmitting HNM 28 enters the diplexer 40 and passes to the internal diplexer 42 of the HRU 44. The signal from the diplexer 42 is band pass filtered by BP filter 46, amplified by amplifier 50, and RF down-converted by down-converter 54 to an intermediate frequency (IF). In one embodiment, the intermediate frequency is 630 MHz. Other different frequencies can be used without departing from the principles of the invention. Usage of the intermediate frequency simplifies the RF design, by keeping the signal, its images, and the local oscillator frequency separate from each other. Having the BPFs 46, 48 external to the diplexer 42 simplifies the implementation of the diplexer 42.

The IF filter and amplifier unit 58 then amplifies and band pass filters the IF signal. The RF up-converter 56 shifts the frequency of the IF signal up to the downstream frequency band. The amplifier 52 and BP filter 48 then amplify and filter the downstream signal. The amplifiers 50, 52 with the amplification provided by the IF filter and amplifier unit 58, sufficiently amplify the home network signal to improve the reach of the home network signal inside the home. This downstream signal then passes through the diplexers 42, 40 back to the backbone 20 of the home network 10. Thus, the HNMs 28 communicate with each other by issuing messages to the backbone 20 (i.e., the upstream signal). The HRU 44 receives the upstream signal, amplifies and shifts the RF frequency of the upstream signal, and then returns the upstream signal with the shifted frequency to the backbone 20 as the downstream signal. The HNMs 28 then receive the messages in the downstream signal from the backbone 20. Before the downstream signal reaches the backbone 20, the diplexer 40 combines the downstream signal with the CaTV signal (or satellite) for transmission over the in home coax wires 22.

The home network 10 employs transmission power control. Each HNM 28 adjusts its transmission power to such a power level that when its transmitted signal arrives at the HRU 44, that signal has a predefined power level. Thus, the input power of the upstream signal arriving at the HRU 44 remains constant because each HNM 28 uses an appropriate transmission power level to account for the attenuation of the signal over the backbone 20 and thereby achieves the predefined power level at the HRU 44. Also because power level of the inputted upstream signal is constant and the amplification performed by the HRU 44 is constant, the downstream signal leaving the HRU 44 is also constant.

In one embodiment, the upstream signal at the input to the HRU 44 is −50 dBm, and the downstream signal at its output is −10 dBm. Accordingly, a HNM 28 can transmit at a power between −10 dBm, if located far from the HRU 44, and −50 dBm if located close to the HRU 44. The actual transmitted power is determined according to the attenuation between the remote HNM 28 and the HRU 44. For instance, if the attenuation is 10 dB, the HNM 28 should transmit −40 dBm. If the HNM 28 is located 40 dB from the HRU 44, that HNM 28 should transmit at a power of −10 dBm so that the upstream signal can reach the HRU 44 with a power of −50 dBm.

The HRU 44 transmits at a constant power (e.g., −10 dBm). Therefore, if the HNM 28 is located 25 dB from the HRU 44, that HNM 28 receives the downstream signal at a power of −35 dBm (−10 dBm−25 dBm=−35 dBm), irrespective of which HNM 28 sent the upstream signal to the HRU 44 that reflected back as the downstream signal.

Employing this transmission power control simplifies significantly the gain control function at the receiver and at the transmitter of the home network signal, particularly if each HNM 28 can set the gain just once during initialization.

In one embodiment, the home network signal transmitted over the home network backbone 20 is in the 960 to 1046 MHz frequency range, but other frequency bands above the CaTV signals can be used. The CaTV signal (including the signal from Internet providers) is in the frequency range of 5 to 860 MHz. Table 1 shows that frequencies above 960 MHz are available for use in those homes in which CaTV signals are installed. It should be noted that at frequencies greater than 1000 MHz, low quality splitters found in the home provide poor signal isolation and return loss performance.

TABLE 1

| Frequency Range (MHz) | Signal |
|---|---|
| 870-896 | Cellular mobile phone uplink |
| 896-902 | Private land mobile radio |
| 902-928 | Amateur radio service reserve |

TABLE 1-continued

| Frequency Range (MHz) | Signal |
|---|---|
| 928-932 | Domestic public radio service (paging) |
| 944-947 | Broadcast radio service (intercity relay) |
| 950-2100 | DBS (Satellite over coax) |

In another embodiment, the home network signal is in the 5-45 MHz frequency range. This frequency band is used by the U.S. cable television operators for reverse path signals, i.e., signals that the home devices 33, such as set top boxes (STB) and cable modems (CM), transmit back to the cable provider (i.e., the head-end). For the European standard (called DVB), the reverse path frequency is located in the band from 5-65 MHz.

Reverse channel signals transmitted to the head-end include the Reverse Data Channel Out Of Band (RDC OOB) signals from the STB and the Reverse Data Channel of the CM (RDC CM). To ensure proper operation of the set-top boxes and cable modems over the home network 10, the reverse channel signals should return seamlessly to the head-end. The head-end determines the actual frequencies used for the reverse channel signals and the bandwidth for each channel is small compared to the 5-45 MHz frequency range. Typically, but not necessarily, the set-top boxes and cable modems in the home use the same programmable frequencies for the return channel. The head-end determines the frequency allocation and transmits information regarding the allocated frequencies to the devices 33 in the home.

To transmit this information, the head-end uses frequencies above 50 MHz. This communications channel, at frequencies above 50 MHz, is termed the Out of Band Forward Data Channel (OOB FDC). Because frequencies above 50 MHz pass freely through the home network 10, this OOB FDC signal carrying RDC OOB and RDC CM information passes unimpeded to the set top boxes and the cable modems connected directly (that is not through a HNM 28) to the coaxial cable 22.

Figure 3:
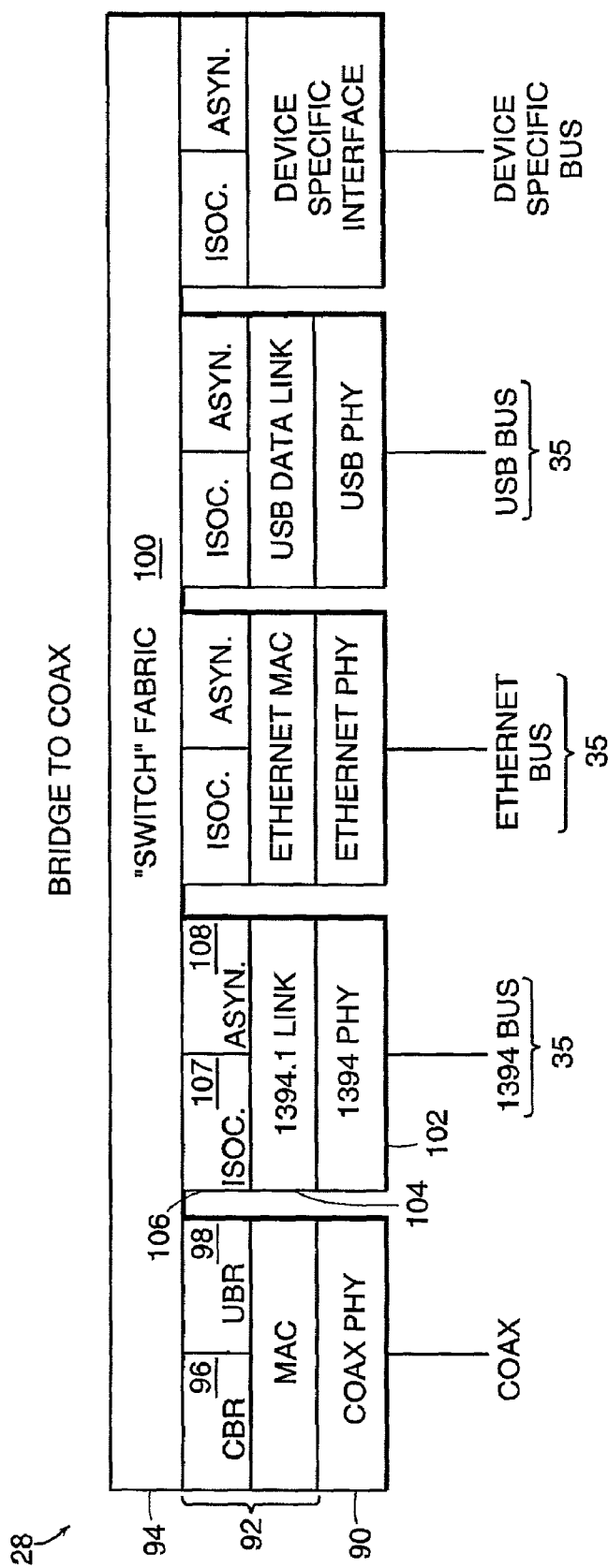
FIG. 3 is a block diagram of an embodiment of a home network module.

FIG. 3 shows an exemplary conceptual embodiment of an implementation of the HNM 28, which functions as bridge between the coax backbone 20 and each local bus 35. In brief overview, the HNM 28 receives a signal from a device 33 through a data port and converts that signal into a modulated analog signal over the backbone 20, combined with the Cable TV signal. In the other direction, the HNM 28 receives an analog signal over the backbone 20 and converts the analog signal into a data signal. In one embodiment, the HNM 28 is implemented as an IC (integrated circuit) chip set that is incorporated in an entertainment or data device, or in a standalone box.

The backbone-side of the HNM 28 includes a physical layer 90, a media access control (MAC) layer 92, and a network layer 94. The MAC layer 92 supports constant bit rate (CBR) transmission and an unspecified bit rate (UBR) transmission with CBR 96 and UBR 98 protocols, respectively. To support quality of service (QoS) requirements, the CBR protocol 96 is used for the transmission of isochronous data and the UBR protocol 98 for the transmission of asynchronous data. The network layer 94 includes a switching fabric 100 for controlling the flow of isochronous and asynchronous traffic between the backbone 20 and each local bus 35.

The architecture of the protocol stack on the local-bus-side of the HNM 28 depends on the type of local bus. For example, if the local bus is an IEEE 1394 bus, then the HNM 28 includes a 1394 Phy layer 102, a 1394.1 link layer 104 (with bridge functionality), and a network layer 106 that supports isochronous 107 and asynchronous 108 transmissions. In one embodiment, the local bus is an Ethernet bus, which has Ethernet-specific Phy and MAC layers. In another embodiment, the local bus is a universal serial bus (USB), which correspondingly has USB-specific Phy and data link layers. In an embodiment in which the HNM 28 is integrated in a device, such as a set top box and a personal computer, the bus is specific and internal to that device, and the bus-side of the protocol stack includes a device-specific interface for communicating on the bus.

In other embodiments, the HNM 28 operates as a bridge between the backbone 20 and a plurality of local buses of different types. For example, as shown in FIG. 3, the HNM 28 is a bridge for 1394, 802.3, and a USB local buses. The HNM 28 can support other types of local buses and different combinations of local bus types without departing from the principles of the invention. If the HNM 28 resides in a device, such as in a STB, the various local buses are connected directly to a local bus internal to that device.

Figure 4:
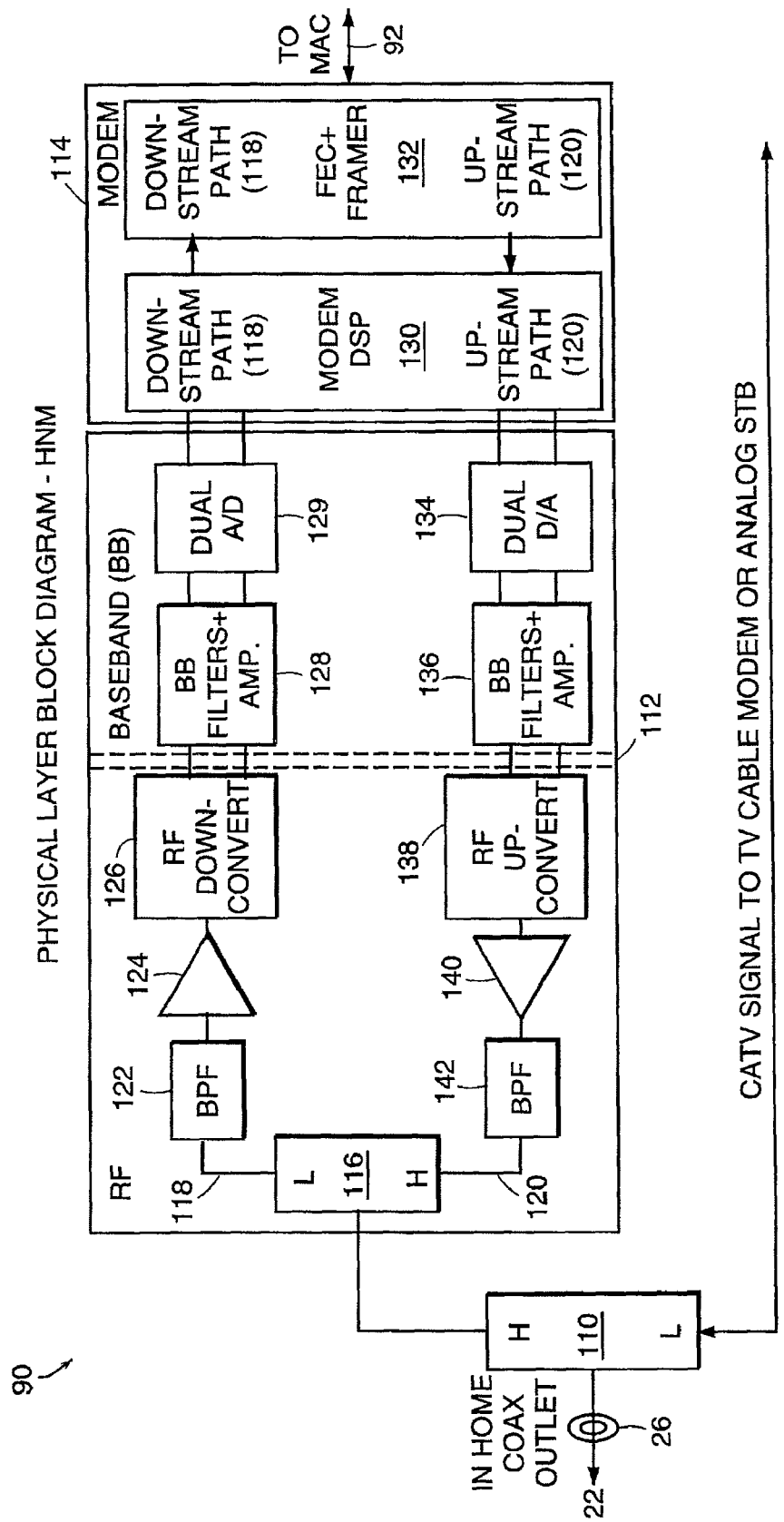
FIG. 4 is a block diagram of an embodiment of a physical layer of the home network module of FIG. 3.

FIG. 4 shows an exemplary embodiment of the physical layer 90 of the HNM 28, including the diplexer 110, RF/Analog unit 112 (hereafter RF unit) and a modem 114. The diplexer 110 is connected to the coax outlet 26 in the room 30 and separates the CaTV signal (frequencies 5-860 MHz) from the home network signal. The CaTV signal includes the broadcast video, video in demand, cable modem and all other signals that are delivered by the Cable TV operator to the home, and return path signals, like the cable modem return channel, Interactive TV etc. The CaTV signal can pass to other electronic devices in the room 30, such as a TV cable modem and an analog set-top box (STB). The home network signal passes to the RF unit 112.

The RF unit 112 includes a diplexer 116, which is connected to a downstream path 118 (here, from the backbone 20 to the local bus 35) and an upstream path 120 (from the local bus 35 to the backbone 20). From the home network signal, the diplexer 116 and filters 122, 142 separate the downstream signal from the upstream signal. The downstream signal passes towards the local bus 35 and the upstream signal towards the backbone 20.

The bandpass filter (BPF) 122 filters the downstream signal (lower frequencies) to remove the upstream signal and out-of-band noise. The downstream signal passes through a low noise amplifier 124 and RF down-conversion circuitry 126. The RF down-conversion circuitry 126 converts the downstream signal to baseband frequencies. Embodiments of the RF down-conversion circuitry 126 include an I/Q demodulator or a mixer.

If the RF down-conversion circuitry 126 is operating as an I/Q modulator, the I-channel and Q-channel pass separately to the broadband filter/amplifier unit 128, which low-pass filters the I-channel and Q-channel separately to remove the image of the signal. The I-channel and Q-channel then pass through a dual analog-to-digital (A/D) converter 129. The dual A/D 129 has a separate A/D converter for the I-channel and for the Q-channel. The digital output of the A/D converter 129 enters the modem 114. The modem 114 includes a digital signal processing (DSP) portion 130 and a framer 132.

In general, the modem 114 uses an efficient modulation scheme, like QAM, multi QAM, Orthogonal Frequency Division Multiplexing (OFDM) or Discrete Multitone (DMT). In one embodiment, the backbone 20 supports 100 Mbps bit rate. If, for example, the modem 114 uses QAM 256 (8 bits per symbol), only 12.5 MHz (100/8) of bandwidth is required. The use of efficient bandwidth modulations achieves higher data rates for a specific frequency band produces less cross talk between potentially interfering signals. Another advantage is that the modem 114 enables the home network 10 to coexist with pre-existing low-quality splitters often found in the cable networks of the home. Such splitters are frequency limited—at frequencies above 1000 MHz the performance of such splitters degrades significantly. Reflections can occur at the splitter, resulting in inter-symbol interference to the home network signal.

The upstream path 120 passes from the modem 114 to the diplexer 116 through a dual D/A converter 134, a baseband filter/amplifier unit 136, RF up-conversion circuitry 138, an amplifier 140, and a band-pass filter 142. On the upstream path 120, the DSP 130 generates one or two output words corresponding to one or two D/A converters 134, depending upon the embodiment of the RF up-conversion circuitry 138. Embodiments of the RF up-conversion circuitry 138 include an I/Q modulator or a mixer. If I/Q modulation is used in the RF up-conversion circuitry 138, then two output channels are implemented, with two D/A converters 134. If the mixer is used, then only one D/A converter 134 is needed.

The analog baseband signal generated by the DI/A converters 134 passes through baseband filters 136 and then is up-converted by the RF up conversion circuitry 138 to the upstream frequency band. The power amplifier 140 amplifies the RF up-converted signal and the bandpass filter 142 filters the signal and the diplexer 116 combines the upstream signal with the CaTV signal for transmission over the home coax backbone 20. The gain of the amplifiers 124 and 140 are programmable, and the modem DSP 130 sets this gain.

Figure 5:
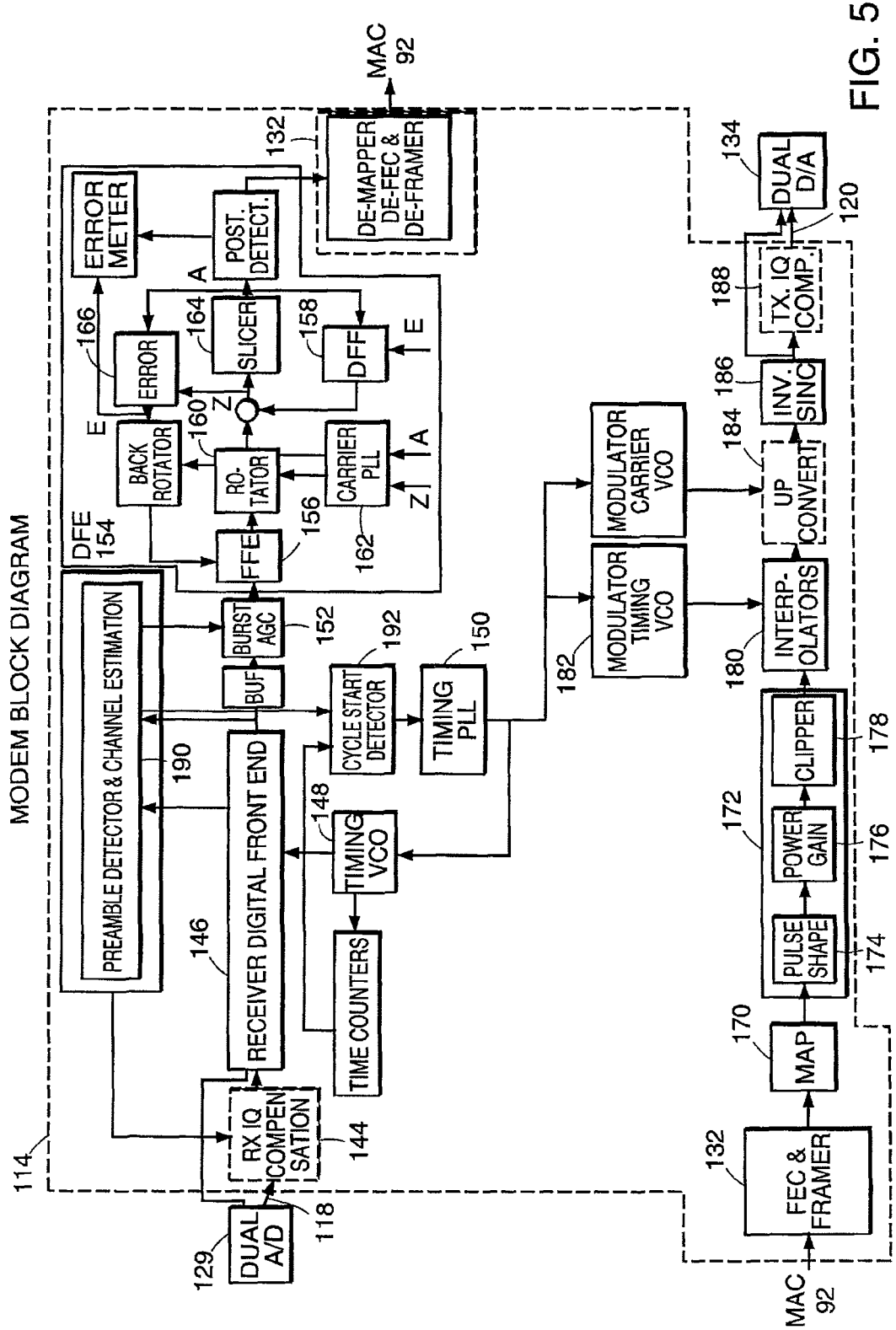
FIG. 5 is a block diagram of embodiments of a modem in the home network module of FIG. 3.

FIG. 5 shows two embodiments of the modem 114, including the DSP 130 and the framer 132. Signals take two paths through the modem 114; the downstream path 118 from the dual A/D converter 129 to the MAC 92 through the framer 132 and the upstream path 120 from the framer 132 to the dual D/A converter 134.

In FIG. 5, two embodiments of the modem 114 are shown. In a first embodiment, I/Q modulation occurs at the RF unit 112. This embodiment includes an I/Q compensation block 144 (shown in phantom) that compensates digitally for different I/Q modulation imperfections, such as local oscillator leakage, I/Q phase and amplitude imbalance, and DC signal components. The I/Q compensated signal passes to receiver front-end circuitry 146, which includes a match filter and an interpolator (both not shown). The match filter filters noise and other undesired out-of-band signals. The interpolator outputs a signal that is sampled at an integer multiple of the received sample rate based on timing recovery information received from a timing VCO block 148 and a timing PLL block 150 provide. The timing recovery is useful because the A/D converter 129 samples the downstream signal at its particular sampling frequency, which approximates but may not equal the symbol rate of the HNM 28 that transmitted the signal.

In a second embodiment of the modem 114, I/Q modulation occurs at the DSP 130 of the modem 114 (because the RF unit 112 uses a standard mixer; thus, this embodiment has no T/Q compensation block 144. Also, the receiver front-end 146 of this embodiment includes a down-converter block and low-pass filter (both not shown) to perform the I/Q demodulation.

The output of the receiver front-end 146 passes to a burst AGC block 152, which provides digital gain control per burst to optimize the signal level at the input to the equalizer 154. From the burst AGC block 152, the signal passes to a decision feedback equalizer (DFE) 154. The DFE 154 includes a feed forward equalizer (FFE) 156 and a decision feedback filter (DFF) 158. To overcome frequency offset between the transmitting and receiving HNMs 28, the DFE 154 includes a rotator 160, which is applied at the output of the FFE 156. A carrier recovery PLL 162 sets the correction frequency of the rotator 160. The output of the rotator 160 minus the output of the DFF 158 enters a slicer circuit 164 to make a decision on the received symbol. The error signal 166 is equal to a distance between the decided symbol and the input to the slicer circuitry 164. The error signal 166 gives an indication to the amount of noise and the quality of the received signal and decisions. The error signal 166 is also used for the adaptation of the equalizers during packet receiving. The received symbols sent to the framer 132 for de-mapping, de-forward error correcting (FEC), and de-framing, to extract the transmitted data bits, which are delivered to the MAC (Medium Access Controller) 92 for upper layer processing.

On the upstream path 120, the framer 132 receives data bits from the MAC 92, which frames the bits. A mapper 170 maps the encoder-framed bits to generate the transmitted QAM symbols. A transmitter front-end 172 processes the QAM symbols. The transmitter front-end 172 includes a pulse shaper 174, a digital power gain adjuster 176 for fine tuning the transmitted power, and a clipper 176 to reduce the peak-to-average ratio of the transmitted signal to relax RF transmitter requirements. An interpolator 180 synchronizes the transmitted symbol rate with the symbol rate of the master HNM 28. The modulator timing VCO loop 182 performs the synchronization.

Because QAM symbols are complex numbers, the signal leaving the interpolator 180 is a complex signal, that is, the signal is made of two streams of data (a real channel and an imaginary channel). If the DSP 130 is implementing I/Q demodulation, the DSP 130 includes an I/Q frequency up-converter 184 to create a real signal. An inverted-sinc filter 186 then shapes the resulting I/Q signal band and delivers the shaped signal to the D/A converter 134.

If the DSP 130 is not implementing I/Q demodulation, because the RF unit 112 is performing the I/Q demodulation, the I/Q frequency up-converter 184 is not used. The signal from the interpolator 180 remains complex and the dual D/A converter convert the two (real and imaginary) signal streams into two analog channels (I and Q). Also, in this embodiment, a transmitter I/Q compensator 188 is employed to handle RF imperfections.

The DSP portion 130 of the modem 114 also includes a preamble detector and channel estimation block 190 (hereafter preamble detector), which is communication with the I/Q compensation block 144 (if any), the receiver front-end 146, a cycle start detector 192, and the burst AGC block 152. The preamble detector 190 also controls the gain of the amplifiers 124 and 140 of the RF unit 112 to provide power control, as described above. The preamble detector 190 provides channel estimations, RF imperfection estimations, and synchronization information for the PLL loop 150. The preamble detector 190 initializes the DFE 154 for each burst. Other functions of the preamble detector 190 include detecting an existing burst in the downstream path 118, distinguishing between types of bursts (described below), and detecting a cycle start signal. Depending upon the type of burst detected, the modem 114 adopts a different behavior.

The MAC (FIG. 3) layer 92 controls the transmission protocol (hereafter MAC protocol) by which the HNMs 28 communicate with each other over the coax backbone 20. In the home network, one of the HNMs 28 connected to the coax backbone 20 is designated as a master HNM 28. In one embodiment, such designation can occur by manually configuring that one HNM 28 to operate as the master HNM 28.

In another embodiment, the HNMs 28 elect the master HNM 28. Functionality of the master HNM 28 includes: 1) assigning addresses to each of the HNMs 28 and devices in the home network; 2) synchronizing the HNMs 28; 3) managing isochronous and asynchronous transmissions over the backbone 20 to avoid collisions between transmitting HNMs 28; 4) allocating bandwidth to the HNMs 28; and 5) registering new HNMs 28. Also, a master HNM that is incorporated in or in communication with a STB (or other device that has access to the cable head-end) operates as a window into the home network through which someone at the cable head-end can monitor and diagnose the operation of the home network 10.

Communication on the coax backbone 20 between HNMs 28 is isochronous or asynchronous, in accordance with the MAC protocol. To exchange messages with each other, the HNMs 28 transmit isochronous and asynchronous bursts over the backbone 20. Each burst has a predefined structure (described below) that encapsulates one or more packets. The header of the packets includes the destination address of the target device for that packet—each packet has its own destination). The data in such packets convey the messages (i.e., the meaning of the communications). The devices 33 on the local buses 35 produce and send the packets to the appropriate HNM 28 to be prepared into bursts. A single burst can include packets that originate from more than one device 33 on a local bus 35 or that are targeted to more than one device 33 on a local bus 35. In general, the MAC protocol ensures that bursts transmitted by different HNMs 28 over the backbone 20 do not collide, or if collisions do occur because of errors or noise over the backbone 20, the home network can recover and resume normal operation.

The MAC protocol supports at least seven types of bursts: 1) cycle start bursts; 2) data bursts; 3) registration start bursts; 4) registration bursts; 5) fairness cycle start bursts, 6) empty bursts, and 7) self-train bursts, each described in more detail below. Only the master HNM 28 issues cycle start, fairness cycle start, and registration start bursts.

The cycle start burst indicates the start of an isochronous cycle and of a transmission cycle (described below). Each cycle start burst carries CBR data of the master HNM 28. The CBR data in the cycle start burst can include management data, an identity of each HNM 28 that is going to transmit a data burst during the upcoming CBR period 228, and a transmission order for the HNMs 28 to follow during the CBR period 228. The other HNMs 28 in the home network 10 synchronize to this cycle start burst.

Fairness cycle start bursts mark the start of a fairness cycle (and a UBR period). Registration start bursts indicate a beginning of a registration period that is available for a new HNM 28 to use, as described below.

Any HNM 28, including the master HNM 28, can issue data bursts, empty bursts, and self-train bursts. Data bursts carry data and management information. Empty bursts carry no data. A HNM 28 transmits an empty burst when it has no data to transmit during its allotted time. The master HNM 28 transmits an empty burst if another HNM 28 does not use its allotted time (and does not issue an empty burst). Self-train bursts operate to calibrate the HNM 28 to the transmission characteristics of the home network.

HNMs 28 other than the master HNM 28 issue registration bursts to register with the master HNM 28, and thus with the home network 10. Within the registration burst, the registering HNM 28 can request a guaranteed bandwidth and indicate the amount of bandwidth desired.

Figure 6:
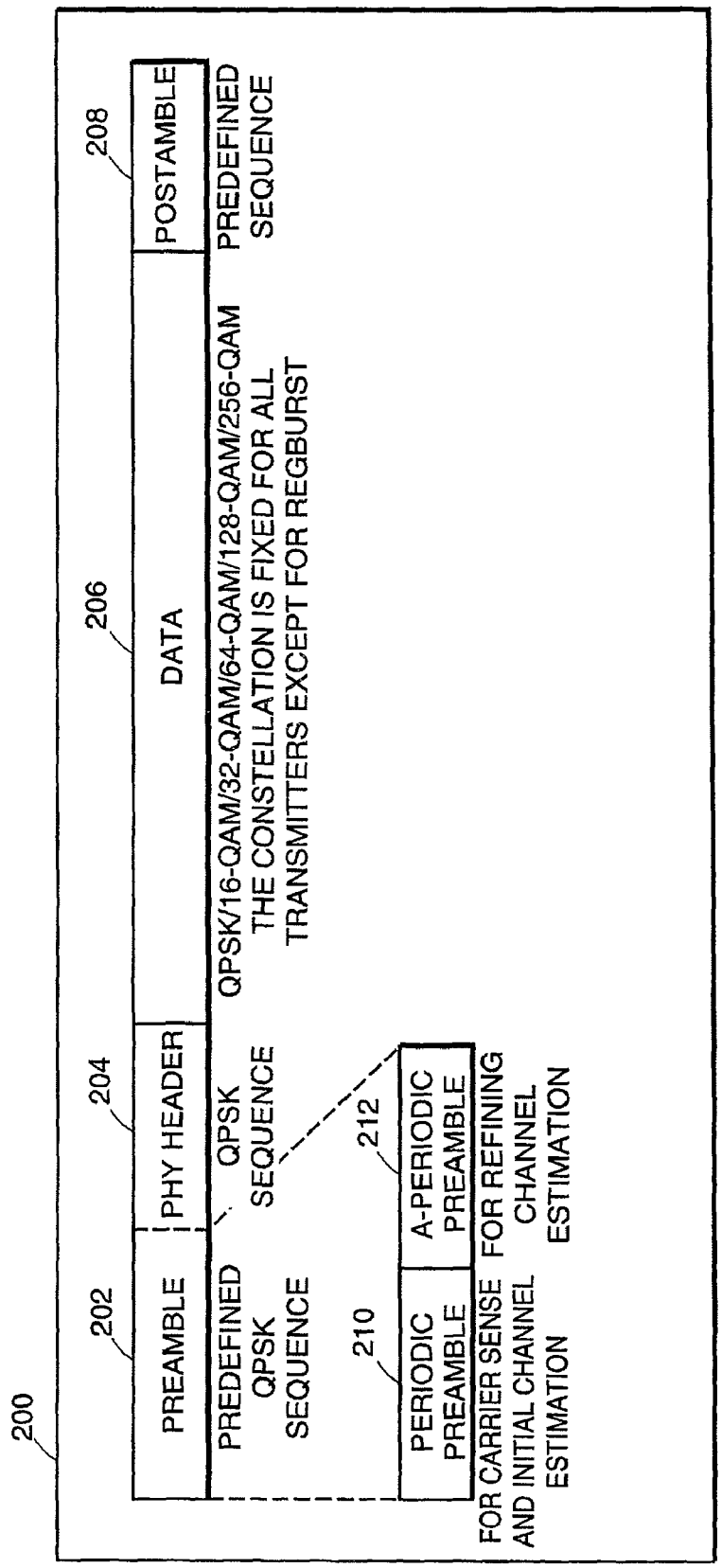
FIG. 6 is a diagram of an embodiment of a burst or message.

FIG. 6 shows an exemplary embodiment of the structure of each burst 200 that the HNMs 28 transmit over the coax backbone 20. Each burst 200 is a sequence of segments that includes a preamble 202 (having a periodic preamble 210 and an aperiodic preamble 212), a Phy header 204, data 206, and a postamble 208.

The preamble 202 signifies the start of the burst 200 and the type of burst 200. In general, the preamble 202 enables the modem 114 of the HNM 28 to synchronize the carrier and timing loops 162, 150, respectively, and the equalizers 156, 158 to the transmitted burst 200. The preamble 202 also enables the setting of the gains of the analog amplifiers 124, 140 in the RF unit 112.

The periodic preamble 210 is a predetermined sequence that enables the modem 114 within the HNM 28 to achieve carrier sense, carrier and timing synchronization, received-power level estimation, and initial channel estimation. In one embodiment, the length of the periodic preamble 210 indicates the type of burst. The length is determined by the number of times a sequence of symbols (e.g., 32 symbols) is repeated. For example, in one embodiment, if the 32-symbol sequence is repeated 4 times then the burst is a data burst, 6 times means that the burst is a cycle start burst, 8 times indicates a fairness cycle start burst, and 10 times indicates a registration start burst.

The pattern of symbols in the periodic preamble 210 can also be used to indicate the type of burst. For example, two different burst types can have the same periodic preamble length, but be distinguished by different symbol patterns (e.g., inverting the sign of the signal for every other repeated symbol sequence). For example, in the embodiment described above, the periodic preamble of the empty burst has a 32 symbol sequence that is repeated four times, which is the same length as the periodic preamble of the data burst. Also, for the self-train burst the 32-symbol sequence is repeated 8 times, which is the same length as the periodic preamble of the cycle start burst. For the empty and self-train bursts, however, the sign alternates for every other repeated symbol sequence, which distinguishes these bursts from the data and cycle start bursts (which do not use an alternating sign), respectively.

There are two classes of bursts: bursts that require channel estimation and bursts that do not. Bursts that require the channel estimation by the receiving HNM 28 include data bursts, cycle start bursts, fairness start bursts, registration bursts, and registration start bursts. Each of these burst types has a preamble 202 of a fixed length; that is, cycle start bursts have a preamble of a first fixed length, fairness start bursts have a preamble 202 of a second fixed length, etc. The distinguishing of burst types by the length of the preamble 202 assures that the receiving HNM 28 achieves real-time performance without the need for extended complexity and buffering. For attaining real-time performance, encoding the burst type by the periodic preamble length is more advantageous than embedding the burst type in the header, as is the usual practice with lower rate systems. Encoding the burst type by the periodic preamble length rather than embedding the burst type in the header avoids a time consuming process of extracting the data embedded in the header to determine the burst type.

Bursts that do not require channel estimation include empty (or null) bursts and self train bursts, which in general have a shorter preamble 202 than the other types of bursts. As described above, the periodic preamble 210 of the preamble 202 for these bursts have an alternating sign (signals of the odd periods are the inverse of signal of the even periods). Although not useful for channel estimation, this type of preamble 202 is useful for burst type identifications.

The modem 114 uses the predetermined aperiodic preamble 212, which is a pseudo-random sequence, to refine the channel estimation and to initialize the modem equalizers 154, 156.

The Phy header 204 includes the parameters that are required by the DSP 130 and FEC 132 to decode the bursts (i.e., a scrambler seed, FEC parameters, interleaver parameters, constellation sizes, etc.). In some embodiments, the Phy header 204 also includes the source address of each device 33 originating the burst. In one embodiment, the Phy header 204 conveys 36 bits of information on 18 QPSK (Quadrature Phase Shift Keying) symbols.

The data 206 carries the QAM symbol data. The constellation is the same for each HNM 28 (when transmitting), except when the HNM 28 is transmitting a registration burst. (Registration bursts are always QPSK, which is the default constellation size for new HNMs 28 requesting to join the home network 10.)

The postamble 208 is a predefined sequence of BPSK (Binary Phase Shift Keying) symbols that the modem 114 uses (along with any gap that follows the burst 200) to recognize as the end of the burst 200.

Figures 7, 7A:
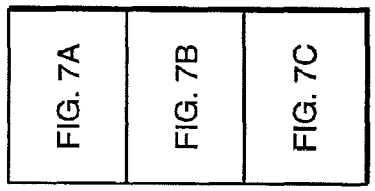
FIG. 7 is a timing diagram showing an exemplary sequence of communication cycles on a backbone of the home network.
Figure 7B:
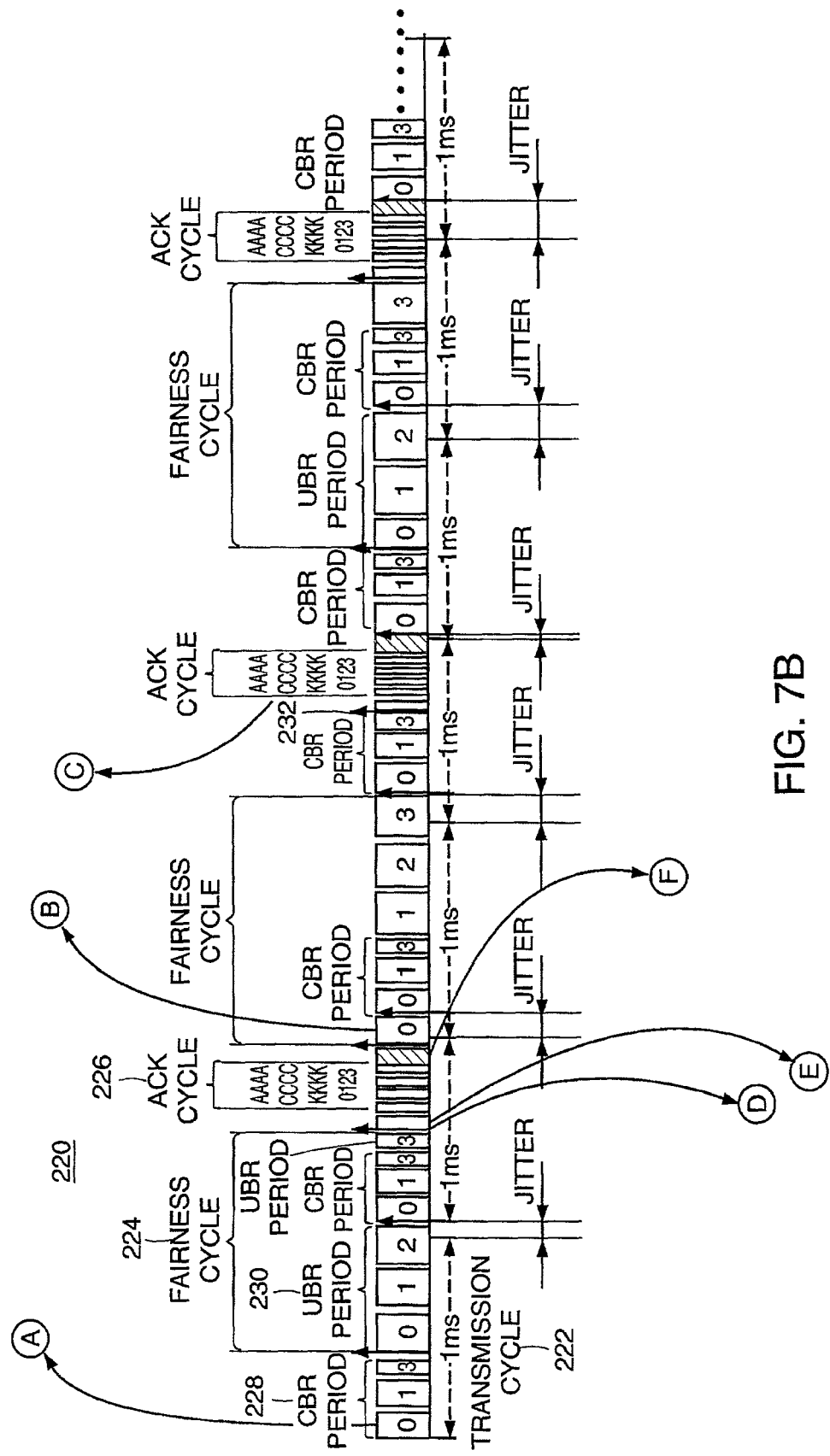
Figure 7C:
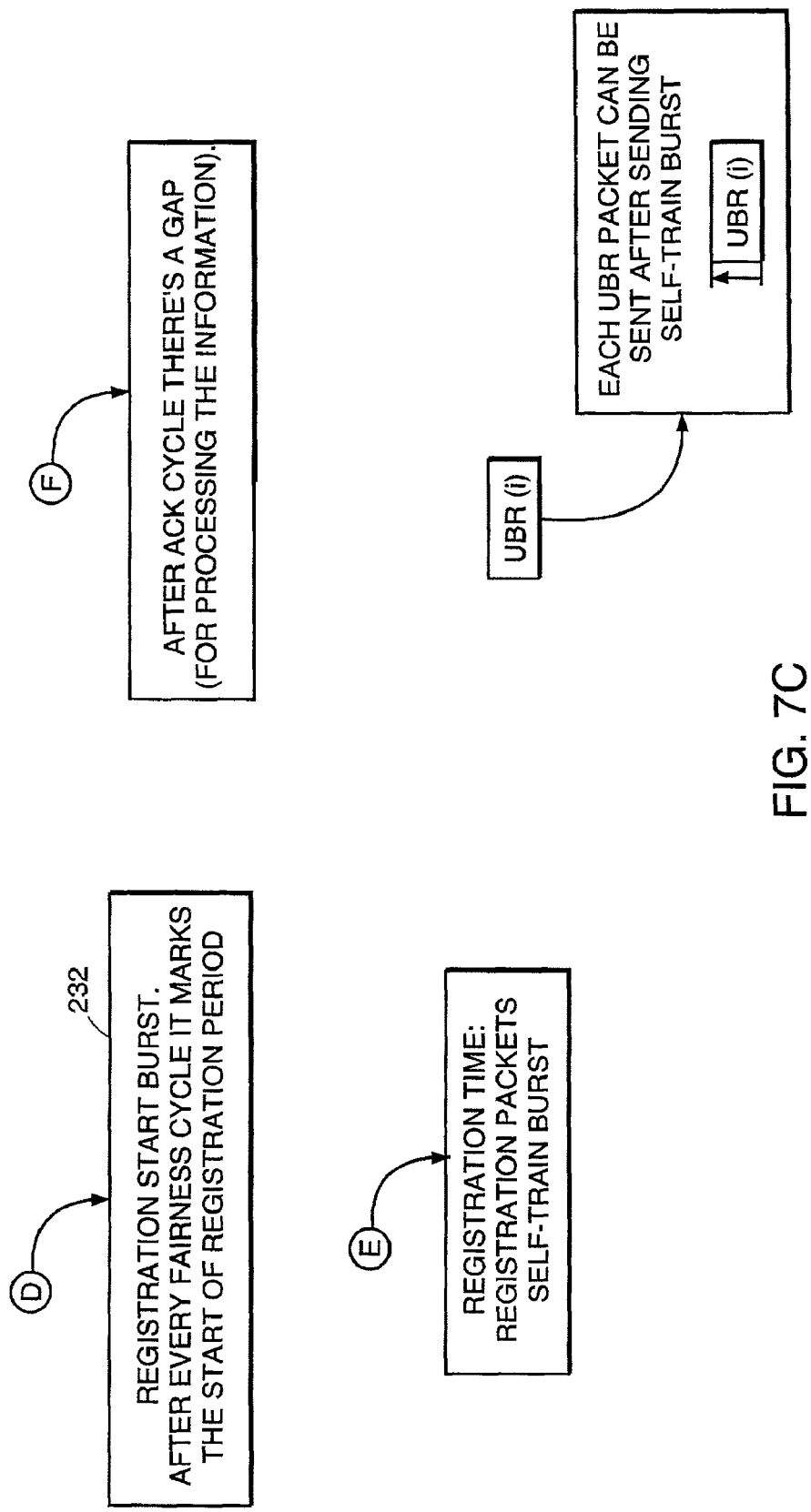

FIG. 7 shows an embodiment of an exemplary sequence 220 of bursts, separated by transmission gaps, produced by four HNMs 28 (HNM 0, HNM 1, HNM 2, and HNM 3) on the coax backbone 20 in accordance with the MAC protocol. Transmission of the bursts over the backbone 20 occurs as a sequence of cycles. Each cycle carries information that enables the HNMs 28 to recover timing and other parameters accurately for the successful receiving and transmitting of bursts.

As shown, the sequence of cycles includes three types of communication cycles, 1) transmission cycles 222, 2) fairness cycles 224, and 3) ACK cycles 226, and four types of periods, 1) constant bit rate (CBR) periods 228, 2) unspecified bit rate (UBR) periods 230, 3) registration periods 232, and 4) ACK periods 226.

Each transmission cycle 222 starts when the master HNM 28 transmits a cycle start burst and ends before the master HNM 28 transmits the next cycle start burst. Each transmission cycle 222 has a predetermined duration (e.g., approximately 1 ms) and starts with a CBR period 228. During this CBR period 228, each HNM 28 that has been allocated bandwidth by the master HNM 28 transmits one CBR burst. (CBR bursts can include one or more CBR packets aggregated together and transmitted during the CBR period.) Each HNM 28 that has been allocated time within the CBR period 228 transmits one burst, but the size (or length) of that burst depends upon the amount of bandwidth allocated to that HNM 28 and upon the amount of data ready for transmission in that particular transmission cycle. If at a particular transmission, the HNM 28 does not have any data ready for transmission, the HNM 28 transmits an empty (or null) burst. This empty burst notifies the next HNM 28 in the transmission order that the next HNM 28 can now transmit during the CBR period 228. The HNMs 28 transmit bursts over the backbone 20 in an order predefined by the master HNM 28. For example, as shown in FIG. 7, the transmission order during each CBR period 228 is HNM0 (the master HNM) followed by HNM1 and then by HNM3. (In this example, HNM2 has no allocated bandwidth during the CBR period 228.) The master HNM 28 can change the amount of allocated bandwidth and the order of transmission, such as when a new HNM 28 registers for guaranteed quality of service. The master HNM 28 communicates such changes to the other HNMs 28 in the data field 206 of the cycle start burst.

If, at the end of the CBR period 228, time remains in the current transmission cycle, a UBR period 230 or a registration period 232 and/or an ACK period 226, follows the CBR period 228. The UBR period 230 is part of a fairness cycle 224, as described below. During the UBR period 230, each HNM 28 can send a self-calibration (or training) burst before sending a UBR burst. (A UBR burst is a burst that is transmitted during the UBR period 230.)

A fairness cycle 224 represents the time over which every HNM 28 transmits one UBR burst over the coax backbone 20. (If a HNM 28 has no data to transmit, the HNM 28 transmits a null burst in its allotted time.) The fairness cycle 224 can span one or more transmission cycles 222. Accordingly, during a fairness cycle 224, UBR periods 230 are interleaved with CBR periods 228.

More specifically, each fairness cycle 224 begins with a UBR burst from the master HNM 28 (called a fairness start burst) and completes after all of the other registered HNM 28 transmits a UBR burst. The HNMs 28 transmit the UBR bursts according to a certain order, starting with the master HNM 28 (here, HNM 0). The UBR bursts do not disturb the synchronization of the transmission cycle; that is, transmission cycles 222 and, thus, CBR periods 228, occur regularly (with some jitter, described below), even if each registered HNM 28 has not yet transmitted an UBR burst. (In such an instance, a fairness cycle 224 spans more than one transmission cycle 222.) Jitter occurs when one of the HNMs 28 is presently transmitting a UBR burst while the start of a new transmission cycle 222 is due to begin. Instead of starting the new transmission cycle 222, the HNM 28 is permitted to complete the UBR burst, which extends the present transmission cycle 222 beyond the predefined transmission cycle period. Jitter is the measure of the amount of time that the UBR period extends beyond the expected end of the transmission cycle 222 (i.e., start of the next CBR period 228).

At the end of a fairness cycle 224, the master HNM 28 transmits a registration start burst to initiate a registration period 232, which extends for a predefined period. (The registration start burst marks the end of the fairness cycle 224.) The master HNM 28 determines when to start the registration period 232. In some embodiments, a registration period 232 can occur as often as after each fairness cycle 224. In other embodiment, the registration period 232 occurs less frequently, such as after a plurality of fairness cycles 224. As described above, generally, with respect to UBR periods 230, the registration period 232 can extend beyond the end of the current transmission cycle 222, thus delaying the start of the next transmission cycle 222.

The registration period 232 is available for use by new HNMs 28 (i.e., HNMs 28 that have been added to the home network and have not yet participated in network communications). During the registration period 232, new HNMs 28 register with the master HNM 28, transmit a self-train burst to adapt the Phy parameters, and if already calibrated, transmits a registration burst. An HNM 28 that transmits a registration bursts expects to receive from the master HNM 28, in a subsequent cycle start burst, a response that includes a new identity for the registering HNM 28 and a position in the UBR transmission order in which to transmit UBR bursts.

During a given registration period 232, more than one HNM 28 might attempt to register with the master HNM 28. Accordingly, collisions between HNMs 28 can occur. However, the number of HNMs 28 participating in any given registration period 232 is typically few; thus, the likelihood of collisions on the home network 10 is generally low. Also, colliding HNMs 28 that do not successfully register during the present registration period 232 retransmit the registration request during a subsequent registration period 232. Each HNM 28 independently and randomly determines the number of registration cycles to wait before retransmitting a registration request. This random and independent retransmission reduces the likelihood that the colliding HNMs 28 will collide again. Further, each HNM 28 that successfully registers during a given registration period 232 does not communicate during subsequent registration periods (subsequent transmissions by successfully registering HNMs 28 occur during the time slot allocated to that HNM 28).

During a registration period 232, the master HNM 28 receives the registration bursts, if any, from new HNMs 28. During the CBR period 230 immediately following the registration period 232, the master HNM 28 responds to one of the registration bursts with a cycle start burst that includes a master management message within the data field 206 of the cycle start burst. The master management message indicates to the registering HNM 28 where that HNM 28 appears in the transmission order during the CBR period 230 and, if required, the amount of bandwidth that has been allocated to the HNM 28.

If the master HNM 28 receives more than one registration request, the master HNM 28 responds to only one of the registration requests, and the other registering HNMs 28 retransmit during a subsequent registration period as described above. The master HNM 28 identifies the HNM 28 to which the master is responding in the Phy header 204 of the cycle start burst.

When the registration period 232 times out, the master HNM 28 transmits an ACK burst, marking the start of an ACK period 226 (or cycle). In one embodiment, the first ACK burst (i.e., ACK0) marks the start of the ACK period 226. In another embodiment, the registration start burst marks the start of the ACK period 226. During the ACK period 226, each HNM 28, starting with the master HNM 28, transmits an ACK corresponding to the UBR bursts during the previous fairness cycle 224.

ACK bursts are used for UBR traffic. Each HNM 28 sends an acknowledge message (ACK) for each burst that the HNM 28 receives. If the transmitting HNM 28 does not receive an acknowledgement from one of the destinations, it retransmits the packets. Using acknowledgment messages improves the performance of the home network 10 in cases of noise that corrupt some burst traffic. Each burst is an aggregation of packets destined for one or more destinations. If an ACK is not received from one or some of the destinations in the burst, the messages corresponding to the unacknowledged packets are retransmitted.

After the ACK period 226, a gap can appear in the communications on the coax backbone 20 when the master HNM 28 is still processing the last ACK burst of the ACK period 226. Then, the master HNM 28 marks the end of the ACK cycle and the start of the next fairness cycle 224 by transmitting a UBR burst. If the expected time for the start of the next transmission cycle 222 arrives, the master HNM 28 transits a cycle start burst.

Figure 8A:
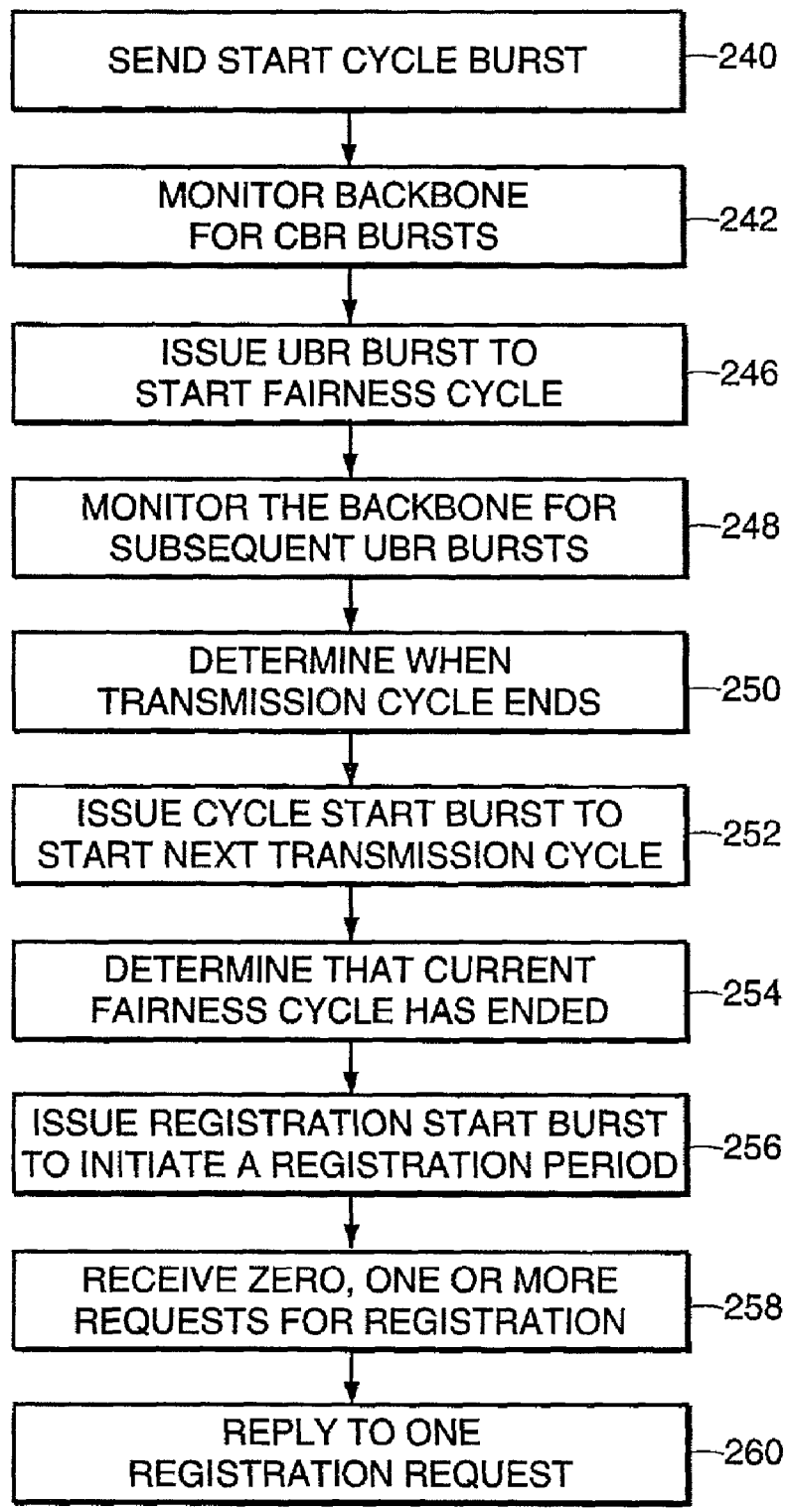
FIGS. 8A-8B are flow diagrams illustrating an embodiment of a process by which the master home network module controls communication on the coax backbone.
Figure 8B:
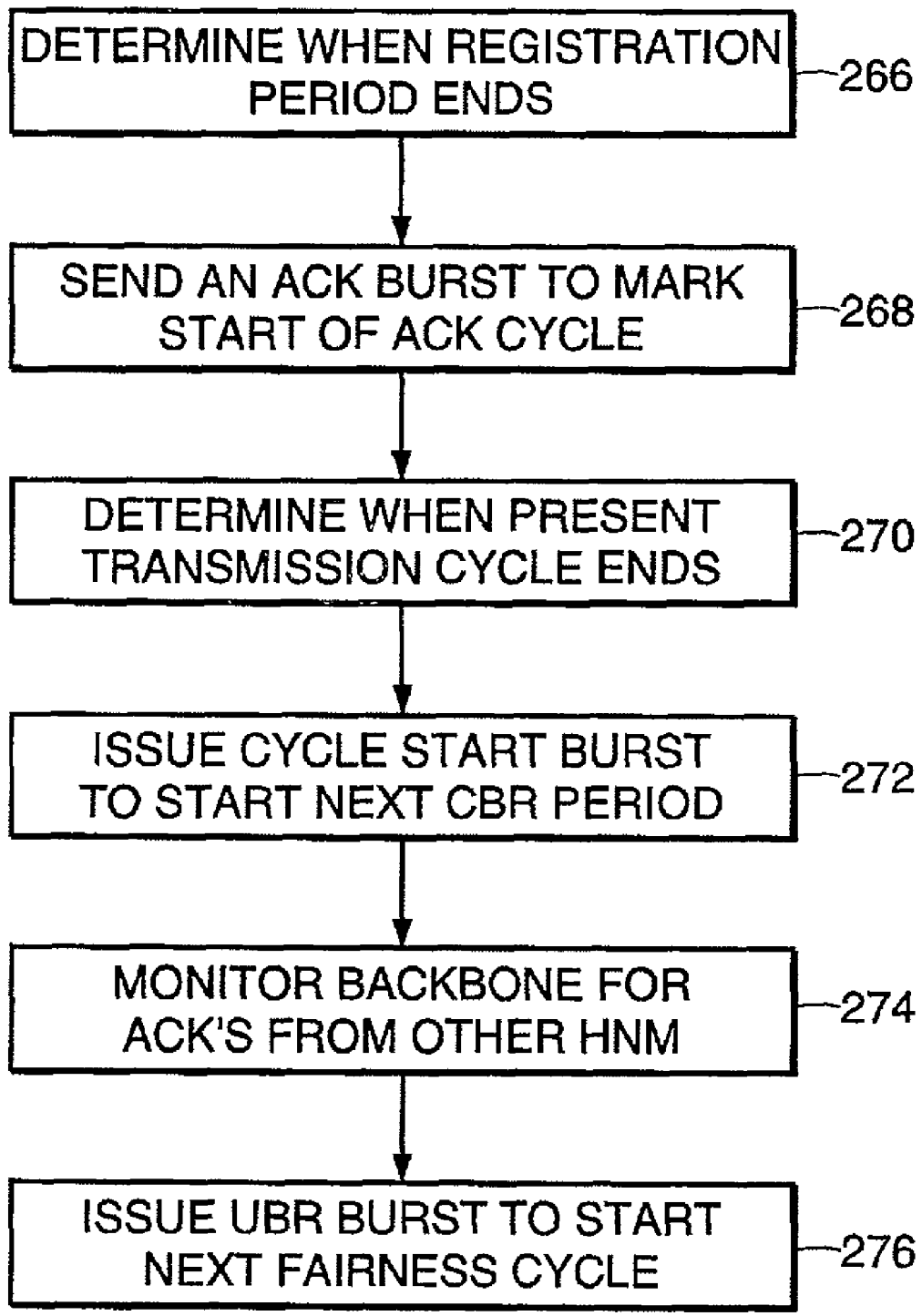

FIGS. 8A-8B show an embodiment of a process by which the master HNM 28 controls communication on the coax backbone 20. To mark the beginning of a transmission cycle 222, the master HNM 28 sends (step 240) a cycle start burst onto the backbone 20. The cycle start burst can include master management data, an identity of each HNM 28 that is going to transmit a data burst during the upcoming CBR period 228, and a transmission order for the HNMs 28 to follow during the CBR period 228. The listed identities are of those HNMS 28 that have requested from the master HNM 28 a guaranteed bandwidth. In one embodiment, the cycle start burst includes information regarding the HNMs 28 that are to transmit a UBR burst during the transmission cycle, such as a transmission order. In another embodiment, the cycle start burst also includes the CBR transmission order information.

The master HNM 28 monitors (step 242) the backbone 20 for CBR bursts.

When the master HNM 28 determines that the CBR period 228 has ended, and if a previous ACK cycle 224 has ended, the master HNM 28 issues (step 246) a UBR burst to start a new ACK cycle. The master HNM 28 monitors (step 248) the backbone 20 for subsequent UBR bursts. The master HNM 28 maintains (step 250) a timer to determine when the present transmission cycle 222 is to end. When the timer indicates the end of the transmission cycle 222, the master HNM 28 starts the next CBR period 228 by issuing (step 252) a cycle start burst. Before issuing the cycle start burst, the master HNM 28 waits for any burst in progress to complete.

When the master HNM 28 determines (step 254) that the current fairness cycle 224 has ended, the master HNM 28 transmits (step 256) a registration start burst to initiate a registration period 232. (In one embodiment, the master HNM 28 can skip one or more fairness cycles 224 before initiating the registration period 232.) During the registration period 232, the master HNM 28 receives (step 258) zero, one or more registration requests. The master HNM 28 replies (step 260) to one registration request during the next CBR period.

The master HNM 28 maintains (step 266) a timer to determine when the registration period ends. When the timer indicates the end of the registration period, the master HNM 28 sends (step 268) an ACK burst to mark the start of the ACK cycle. During the ACK cycle, the master HNM 28 determines (step 270) when the present transmission cycle ends and issues (step 272) a cycle start burst to start the next CBR period 228. In one embodiment, the master HNM 28 waits until the ACK cycle ends before sending the cycle start burst. Also during the ACK cycle, the master HNM 28 monitors (step 274) the backbone 20 for ACKs from the other HNMs 28. Upon detecting completion of the ACK cycle, including waiting for an ACK for its own UBR burst (i.e., if the ACK was requested in that UBR burst), the master HNM 28 issues (step 276) a UBR burst (a fairness cycle start burst) to start a new fairness cycle or a cycle start burst to start a new transmission cycle if the expected time to start a new transmission cycle has arrived.

Figure 9:
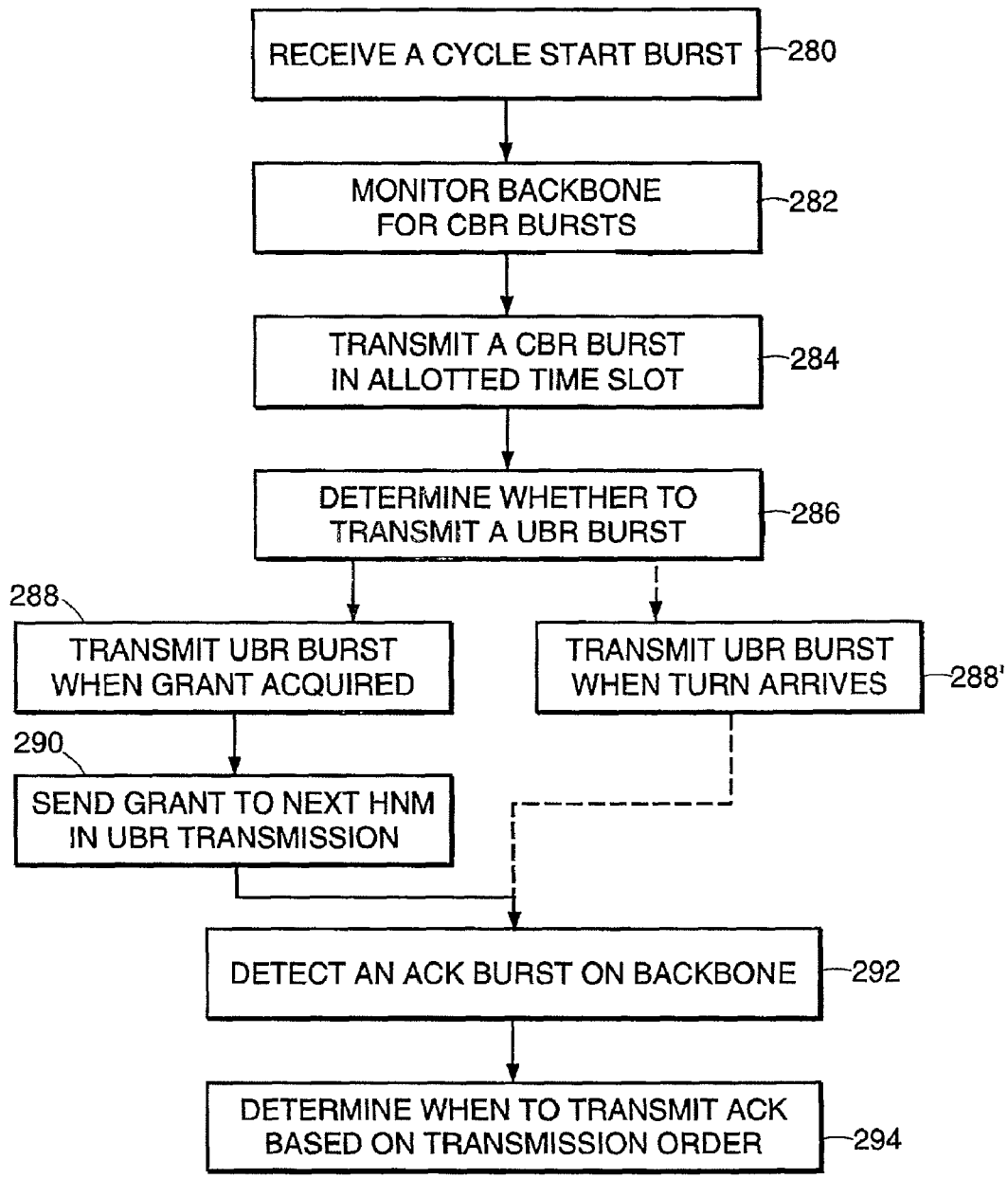
FIG. 9 is a flow diagram illustrating an embodiment of a process by which each home network module in the home network, other than the master home network module, communicates over the backbone of the home network.

FIG. 9 shows an embodiment of a process by which each HNM 28 in the home network, other than the master HNM 28, communicates over the coax backbone 20. In step 280, the HNM 28 receives a cycle start burst and determines from the cycle start burst its positions in the transmission orders for CBR and UBR and its allocated amount of bandwidth. The cycle start burst operates to synchronize communications between the HNM 28 and the master HNM 28. The HNM 28 monitors (step 282) the backbone 20 for CBR bursts, and after waiting for its own allotted time in the CBR transmission order, if any, transmits (step 284) a CBR burst. By monitoring the backbone 20 for CBR bursts, the HNM 28 determines when the CBR period is over (each HNM 28 can determine the list of HNMs 28 participating in the CBR period from the information provided by cycle start burst).

After the CBR period 228 ends, the HNM 28 determines (step 286) whether it can transmit a UBR burst. To be enabled to transmit a UBR burst, in one embodiment the HNM 28 requires (step 288) a grant from the HNM 28 that precedes it in the transmission order. After transmitting the UBR burst, the grant passes (step 290) to the next HNM 28 in the UBR transmission order. In another embodiment, the HNM 28 awaits its turn (step 288') to transmit the UBR burst by monitoring the backbone 20 and counting the number of UBR bursts that were transmitted since the start of the current fairness cycle 224.

In step 292, the HNM 28 detects an ACK burst (or in one embodiment a registration start burst) on the backbone 20, marking the start of an ACK cycle. The HNM 28 determines (step 294) when to transmit the ACK based on its position in the transmission order. If the HNM 28 has an ACK to transmit (depending upon whether it received a UBR requesting an ACK during the previous fairness cycle), the HNM 28 transmits the ACK; otherwise the HNM 28 transmits an empty (null) burst. The HNM 28 can make this determination by monitoring the backbone 20 for ACK bursts or by waiting to receive a grant from the HNM 28 immediately preceding in the UBR transmission order.

Figure 10:
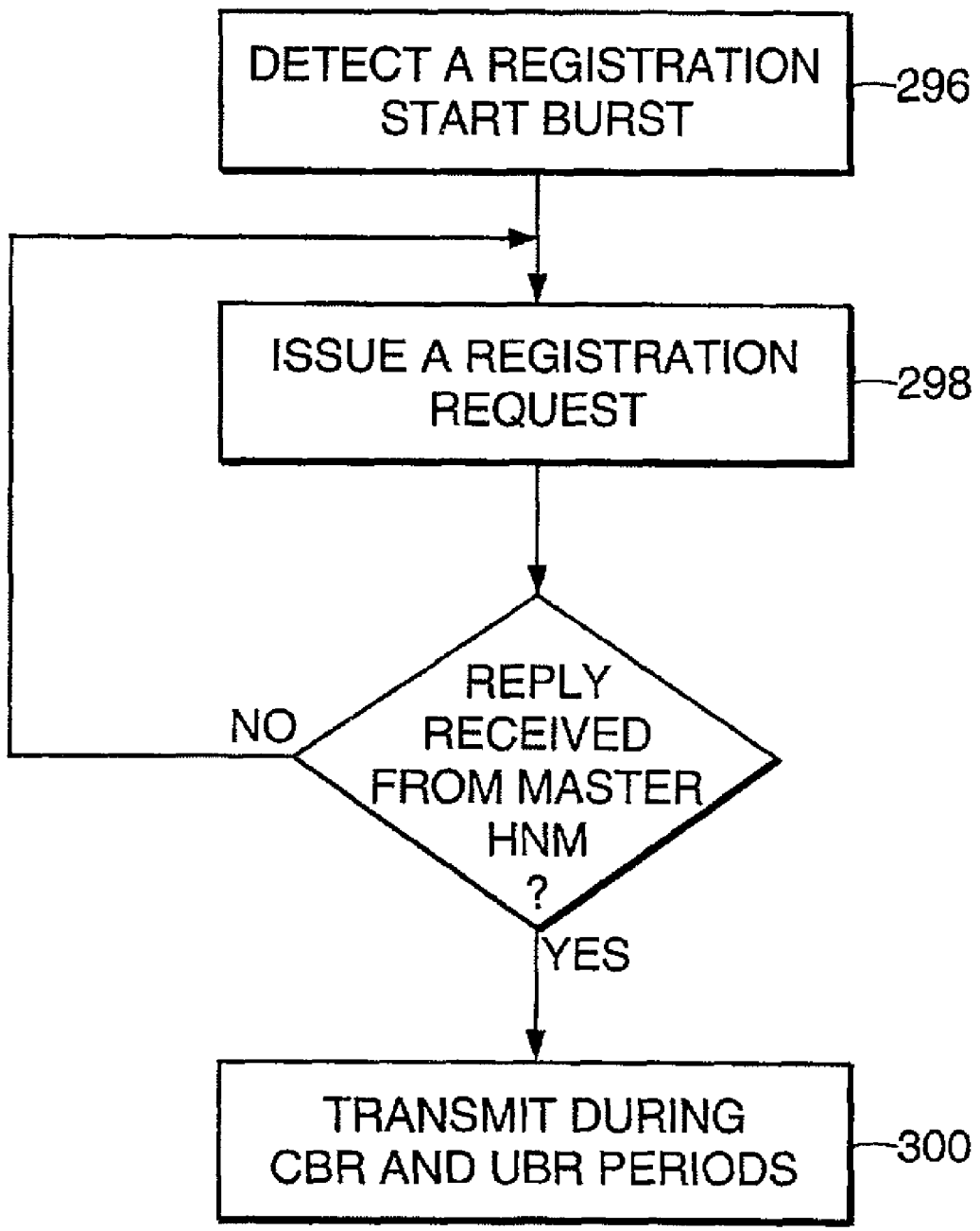
FIG. 10 is a flow diagram illustrating an embodiment of a process by which a new home network module registers to become part of home network.

FIG. 10 shows an embodiment of a process by which a new HNM 28 becomes part of home network 10. Upon detecting (step 296) a registration start burst, the new HNM 28 issues (step 298) a Self_Train Burst (for calibrating its PHY) or a registration request. If the new HNM 28 does not receive a reply indicating that the master HNM 28 has registered the new HNM 28, the new HNM 28 transmits (step 298) another registration request in a subsequent registration period. The new HNM 28 continues to transmit registration requests during subsequent registration periods until the new HNM 28 becomes registered. In one embodiment, the new HNM 28 randomly selects how many registration periods to skip before retransmitting the registration request. After becoming registered, the new HNM 28 transmits bursts during the UBR period as described above.

Referring back to FIG. 1, the home network includes a plurality of local buses 35 each connected to the coax backbone 20 network by an HNM 28. One of the HNMs 28 is the master HNM 28, and the local bus 35 that is connected to the master HNM 28 is the prime bus. If the same HNM 28 connects multiple local buses 35 to the coax backbone 20, each local bus 35 is of a different type (e.g., 1394, Ethernet, USB); if that HNM 28 is the master HNM 28 of the home network 10, then each of such local buses 35 is deemed to be the prime bus (of its particular type).

Figure 11:
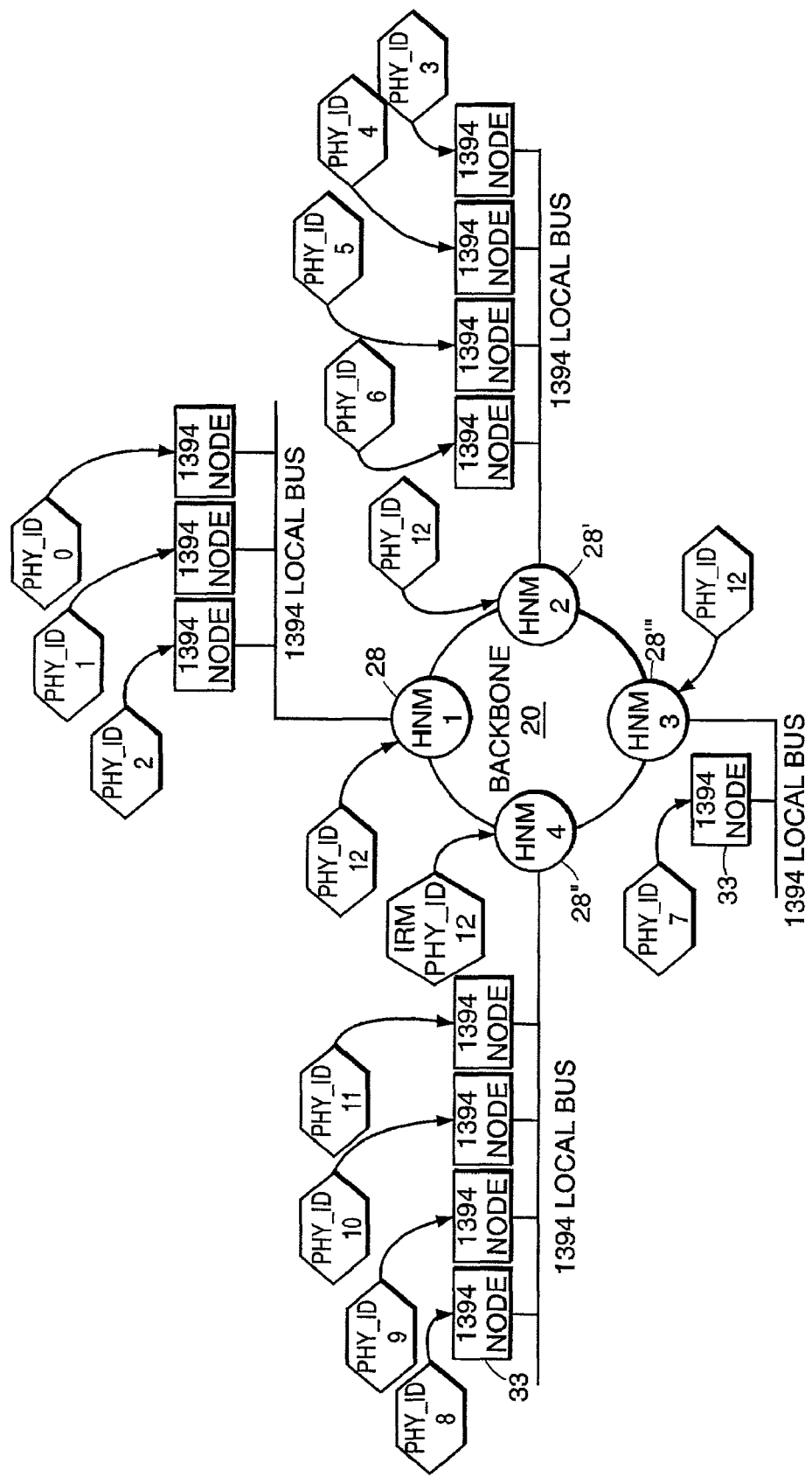
FIG. 11 is a logical diagram of the home network, in which the backbone connects four IEEE 1394 local buses through different home network modules.

FIG. 11 shows one embodiment of the home network 10, in which the backbone 20 connects four IEEE 1394 local buses through different HNMs 28. In this embodiment, each HNM 28 shown operates as a 1394-to-coax backbone bridge between the backbone 20 and the 1394 local bus connected to that HNM 28. Devices 33 that are connected to one of the 1394 buses are referred to as 1394 devices or nodes. Although the backbone 20 appears as a ring, this is for purposes of showing that the HNMs 28 are connected to the backbone 20, and not intended to show that the backbone 20 operates as a ring network.

There are two embodiments of the 1394-to-coax bridge. In a first embodiment, each bridge operates according to the IEEE 1394.1 standard. In a second embodiment, the bridge emulates the plurality of 1394 buses as a single bus so that nodes connected to these 1394 local buses can communicate with each other as though on the same 1394 bus (i.e., using the short haul 1394 protocol).

For the second embodiment, to achieve the appearance that all 1394 devices in the home network are residing on the same 1394 short haul bus, modifications are made to the 1394a Phy and Link layers 102, 104. In brief, the modifications include the following:

1) at the Phy layer 102, modifications to the reset, initialization, and identification processes enable device (or node) discovery throughout the home network 10; and 2) at the Link layer 104, the addition of routing tables (in one embodiment, one table is for isochronous traffic, and another table is for asynchronous traffic, in another embodiment, one routing table handles both traffic types) and the forwarding of packets (incorporated within bursts) to the coax backbone 20 enable delivery of such packets to remote buses over the backbone 20.

The Link layer 104 uses the asynchronous routing table to determine whether the destination identifier of an asynchronous packet is on a remote bus (other than the local bus from which the packet originates). If the destination is on a remote bus, the Link layer 104 sends an ACK_pending packet to the originator of the packet (i.e. source node) and forwards the asynchronous packet to the backbone 20. The HNM 28 incorporates the asynchronous packet within a burst, which can includes other packets targeted to other destinations. If the destination is not on a remote bus, the Link layer 104 operates as a standard Link layer to process the asynchronous packet.

Asynchronous packets between devices on the same local bus 35 remain local to that bus 35. The HNM 28 does not forward such packets to the backbone 20. The HNM 28 routes asynchronous packets destined to a remote device according the asynchronous routing table that resides in that HNM 28 and responds to the packet by sending an ACK_pending packet to the packet originator). The asynchronous routing table defines remote HNMs 28 according to the Phy_ID in the asynchronous packet destination field. The HNM 28 forwards isochronous channel packets and asynchronous streams through the backbone 20 to all the other buses or to other buses according to the isochronous routing table. One clock reference exists for the home network 10. The prime bus generates the common clock, which the HNMs 28 connected to at the other buses each recover.

Referring again to FIG. 11, each local 1394 bus has the following features. Each 1394 node receives a unique Phy identification number (Phy_ID) (0-62), and each HNM 28 receives the same Phy_ID number (a number that is unique from those assigned to the nodes). For each local bus 35, the bus identification number (Bus_ID) is equal to 0x3FF. The home network 10 has one Isochronous Resource Manager (IRM), which is one of the HNMs 28, typically the master HNM 28. Each isochronous channel and each asynchronous stream that is generated in the home network 10 receives its channel number and bandwidth allocation from the single IRM. Each local 1394 bus 35 has its own Cycle Master, which is the HNM 28 of that bus. Each local bus 35 has its own Bus Manager. Arbitration, signaling and data transfers are local to each local bus 35.

Each HNM 28 performs various operations to cause the other remote buses to appear as though on its local bus. Such operations include:

1) sending self-identification (Self_ID) packets according to a reset procedure used for discovering 1394 nodes;

2) forwarding streams through the backbone 20, with updating timestamp of 61883 isochronous packets (the 61883 is a standard that specifies transport of MPEG signals over the 1394 and allows the video transfers between 1394 devices);

3) sending acknowledge pending (ACK_pending) packets to the source of asynchronous packets that are to be delivered to other remote buses according to the asynchronous routing table (responding with an ACK_pending packet satisfies a 10 uSec requirement for ACKs in standard 1394 communications, although an acknowledgement issued by the target of the packets can experience a latency over the backbone 20 of greater than 10 uSec);

4) forwarding asynchronous packets that are to be delivered to other remote buses through the backbone 20 according to the asynchronous routing table;
5) receiving asynchronous packets over the backbone 20 from other remote buses targeted to a device on the local bus of the HNM 28; and
6) distributing a reset that occurs on one bus to the other buses.

To initialize the home network 10, the HNMs 28 perform a global reset process. During the global reset process, the home network 10 conducts an initialization and identification process. As a result, an emulated bus structure is created where all 1394 devices in the network 10 see each other, and each 1394 device has a unique Phy_ID. After the end of initialization and identification processes, each HNM 28 appears as a root 1394 node with three Phy ports.

Figure 12:
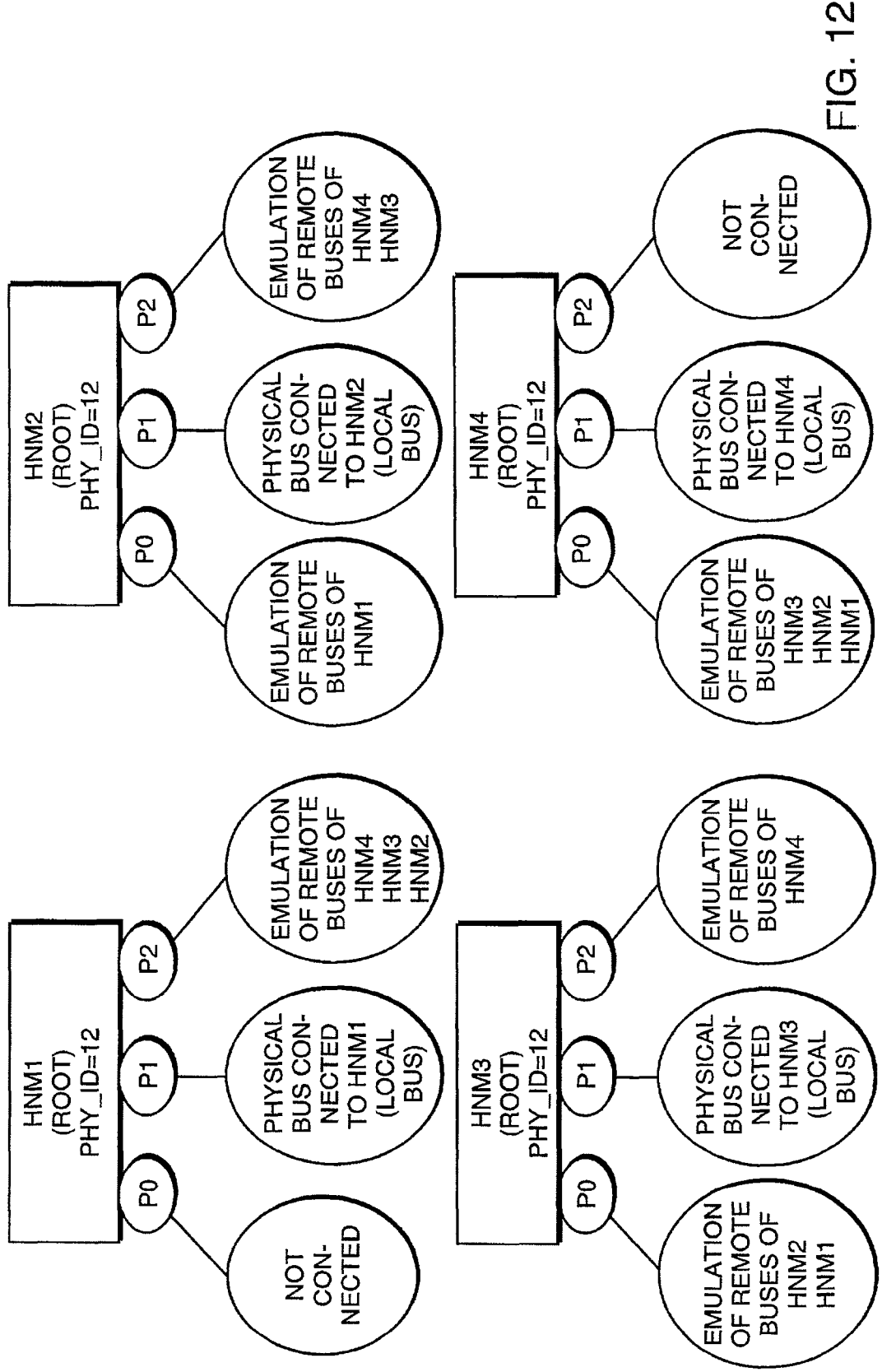
FIG. 12 is a conceptual diagram of an emulated bus structure from the perspective of each home network module.

FIG. 12 is an embodiment of the emulated bus structure from the perspective of each of the HNMs 28. Each HNM (HNM1, HNM2, HNM3, HNM4) is a root node for its respective local bus. Port 1 (P1) of each HNM 28 is connected to the local bus. Phy port 0 (P0) and Phy port 2 (P2) appear to all 1394 devices on the local bus either as not connected or as a branch of the bus. The branch appears to contain other 1394 devices that are physically located in other buses but logically appear to the local bus devices as if they are reside on the same bus. For example, for HNM 1, the P0 port appears as unconnected, the P1 port is connected to the physical bus of HNM1, and the P2 port is an emulation of the other local buses in the home network 10, namely, remote buses of HNM 2, HNM 3, and HNM 4. As another example, for HNM 2, the P0 port is an emulation of the remote bus of HNM 1, the P1 port is connected to the physical bus of HNM2, and the P2 port is an emulation of the remote buses of HNM 3, and HNM 4. Thus, all existing 1394 devices in the network seemingly reside on the same bus. Therefore, any application that works with 1394 buses is supported over the entire home network 10.

Each HNM 28 generates two types of self-ID packets: 1) HNM 28 self_ID packets, and 2) emulated self-ID packets. HNM self-ID packets issued by each HNM 28 describe the three-port root node (shown in FIG. 12) for that HNM 28. Emulated self-ID packets describe all nodes on the other HNM local buses. Each emulated self-ID packet represents the bus structure of two port nodes (P0 and P2) that are connected serially to the root node as one branch.

Initialization of the home network 10 occurs after the backbone 20 has been initialized, that is, the number (N) of HNMs 28 is known, each HNM 28 has its own number (1 through N), and a master HNM 28 is selected. When the initialization ends, the home network 10 is operational.

Figure 13:
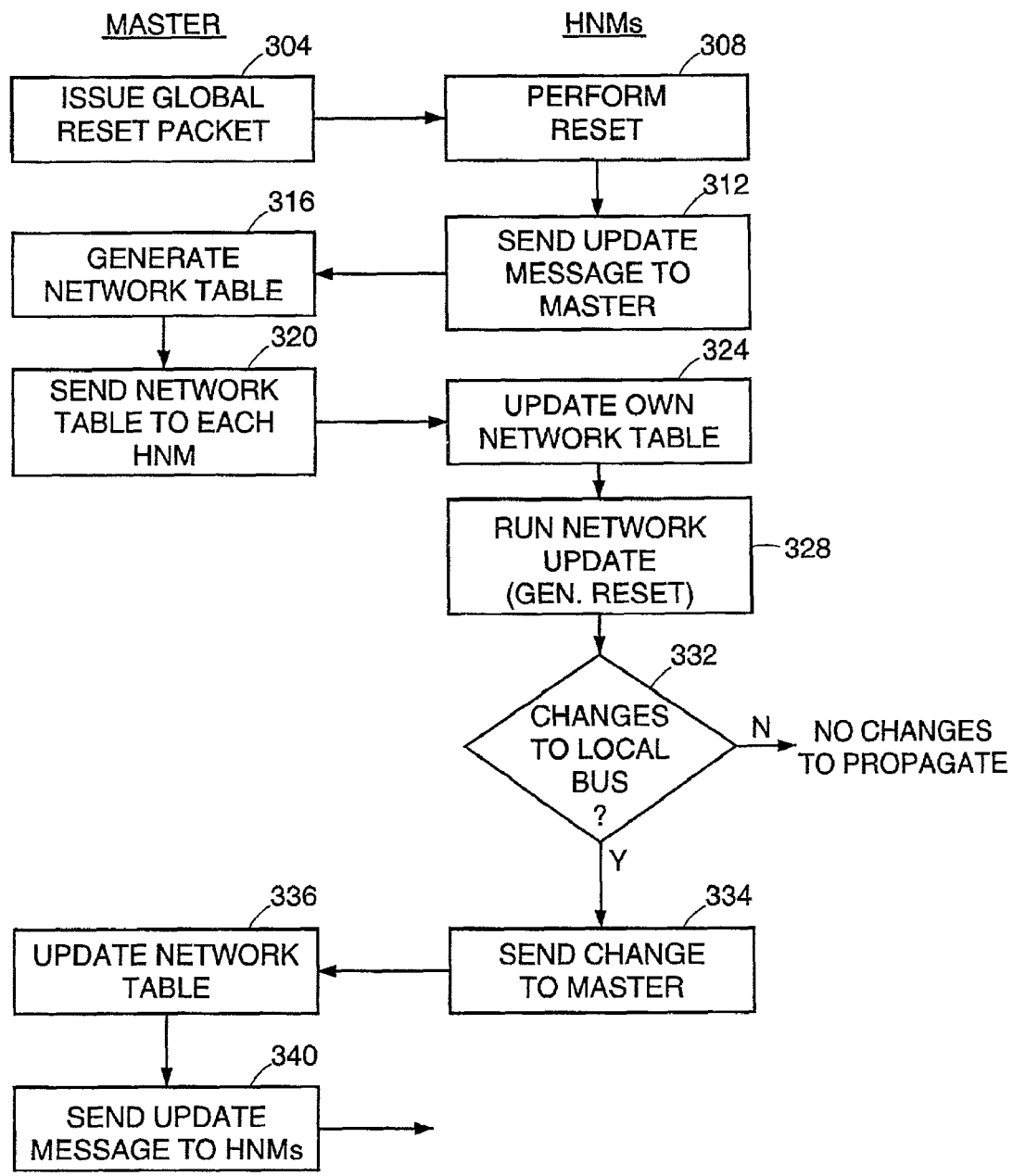
FIG. 13 is a flow diagram illustrating a process performed by each of the home network modules to initialize a 1394 bus in the home network.

Referring to FIG. 13, during initialization, the master HNM 28 sends (step 304) through the backbone 20 a first global reset packet to all the HNMs 28. The reset is performed (step 308) in each bus with the root (i.e., the appropriate HNM 28) governing the reset process. After the reset, each HNM 28 sends (step 312) an updating bus message to the master HNM 28. The updating bus message includes: 1) the Phy_ID of the HNM 28 (i.e., the number of nodes on the bus−1); 2) the link state (active/not active) for each node on the local bus, and 3) an indicator for each node on the local bus whether that node is "bridge capable." (A "bridge capable" device is a 1394 device that is compliant with the IEEE 1394.1 standard.) Also, after the reset, each bus functions locally.

From the updating bus messages obtained from the HNMs 28, the master HNM 28 generates (step 316) a network table. For each HNM 28, the network table includes the number of nodes in the local bus of that HNM 28, the link status (active/inactive) of each node in the local bus of that HNM 28, and the bridge capabilities for each node in the local bus of that HNM 28. After producing the network table, the master HNM 28 transmits (step 320) the network table to each HNM 28 using an update_network_table message. The update_network_table message includes the time for generating the next bus reset. Each HNM 28 updates (step 324) its own network table accordingly.

At the time specified in the update_network_table message, each HNM 28 generates (step 328) a bus reset. After the network completes the initialization, the home network undergoes a network update process. In step 332, if there are no topology changes in the local bus, the reset is not propagated to other buses. After the local bus reset sequence is completed and the HNM 28 port obtains its new Phy_ID, this information is propagated (step 334) by a new_phy_id message to the master HNM 28. The master HNM 28 updates (step 336) the network table and sends (step 340) a update_network_table message to the other HNMs 28. Upon receiving the update_network_table message, each HNM 28 proceeds as described above, that is, by locally resetting the bus (step 308), updating the network table (step 324), and emulating the home network 10 in that bus.

After the completion of the initialization of the home network, each HNM 28 handles asynchronous packets received from the bus (inbound—upstream from local bus to backbone) and asynchronous packets received from the backbone 20 (outbound—downstream from backbone to the local bus). Although described in terms of local 1394 buses, the principles of packet handling applies also to other bus types, such as USB, Ethernet, etc.

Figure 14:
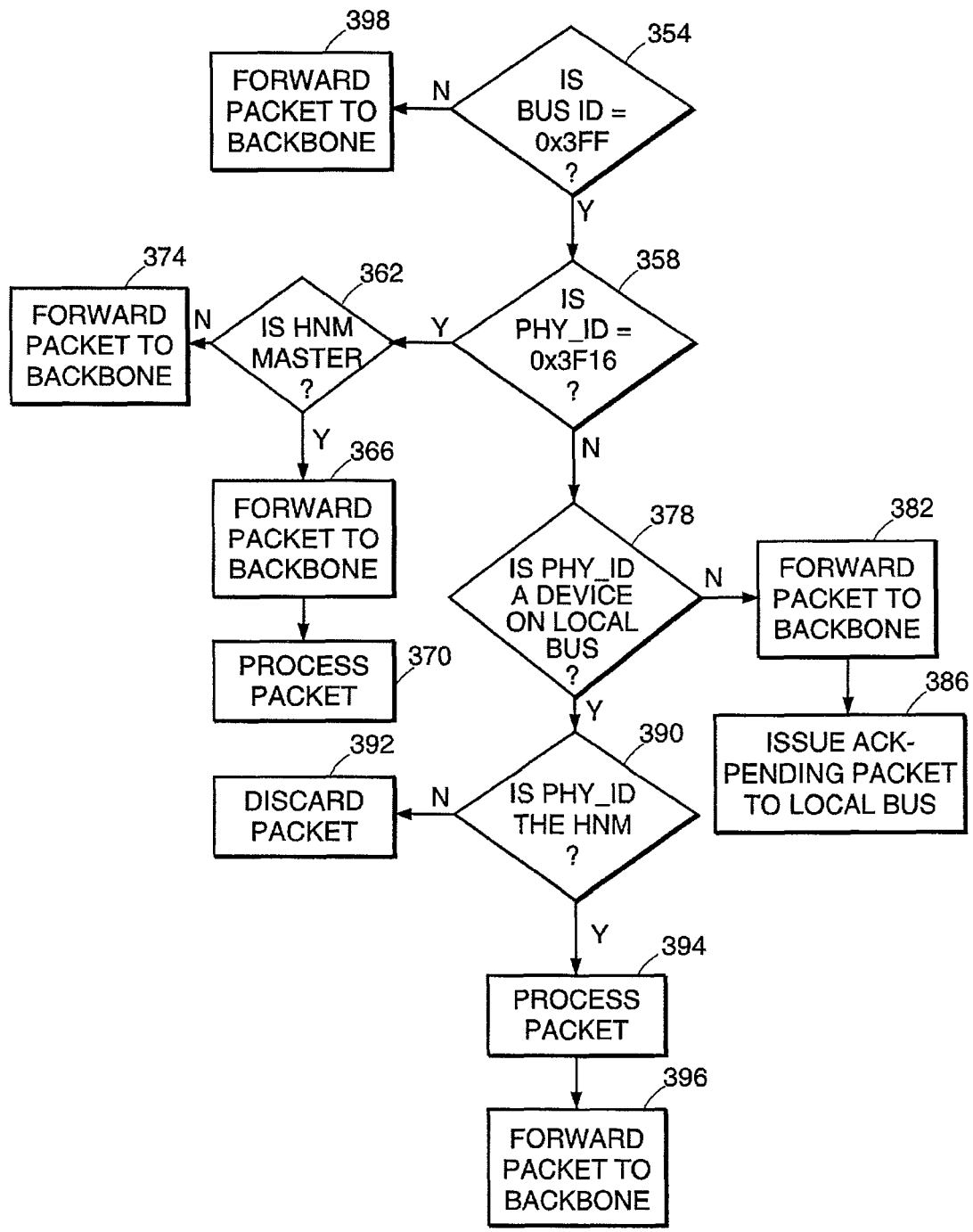
FIG. 14 is a flow diagram illustrating an embodiment of a process by which each home network module handles 1394 asynchronous packets received from the backbone in an emulated bus embodiment.

FIG. 14 shows an embodiment of a process for use by each HNM 28 when handling inbound asynchronous packets. For inbound asynchronous packets, each HNM 28 forwards such packets to the backbone 20 based on the physical ID (Phy ID) destination address, the physical ID of the HNM 28, and the network table. During the initialization process, each HNM 28 maintains two registers, one with the Phy_ID of the node with the lowest ID on its local bus and one with the highest ID on the local bus. A Phy_ID between the highest and lowest IDs is on the local bus.

In step 354, If the bus ID is equal to 0x3FF, which identifies the local bus as a 1394a bus, the HNM 28 performs the following actions:

1. In step 358, if the Phy_ID is equal to 0x3F16, this indicates that the packet is a broadcast packet. In step 362, if the HNM 28 is the master HNM 28, then the HNM 28 forwards (step 366) and processes (step 370) the packet. If the HNM 28 is not the master HNM 28, then the HNM 28 forwards (step 374) the packet. In this instance, the non-master HNM 28 does not process the broadcast packet, thus preventing broadcast packets from accessing non-master HNMs 28. Access to non-master HNMs 28 is the privilege of master HNMs 28, not devices on the local bus.
2. In step 378, if the Phy_ID does not correspond to a node on the local bus, the HNM 28 forwards (step 382) the packet to the backbone 20 and issues (step 386) an ACK_pending (busy or retry) packet to the local bus.
3. In step 390, if the Phy_ID corresponds to a node on the local bus (but not the Phy_ID of the HNM 28), the HNM 28 discards (step 392) the packet.
4. In step 398, if the Phy_ID is that of the HNM 28, the HNM 28 processes (step 394) the packet if the HNM 28 is the master HNM 28, and forwards (step 396) the packet if the HNM 28 is not the master HNM 28. Again, access to non-master HNMs 28 is the privilege of master HNMs 28, not devices on the local bus.

If the bus ID does not equal 0x3FF, the HNM 28 forwards (step 398) the packet and issues an ACK_pending packet to the local bus.

Figure 15:
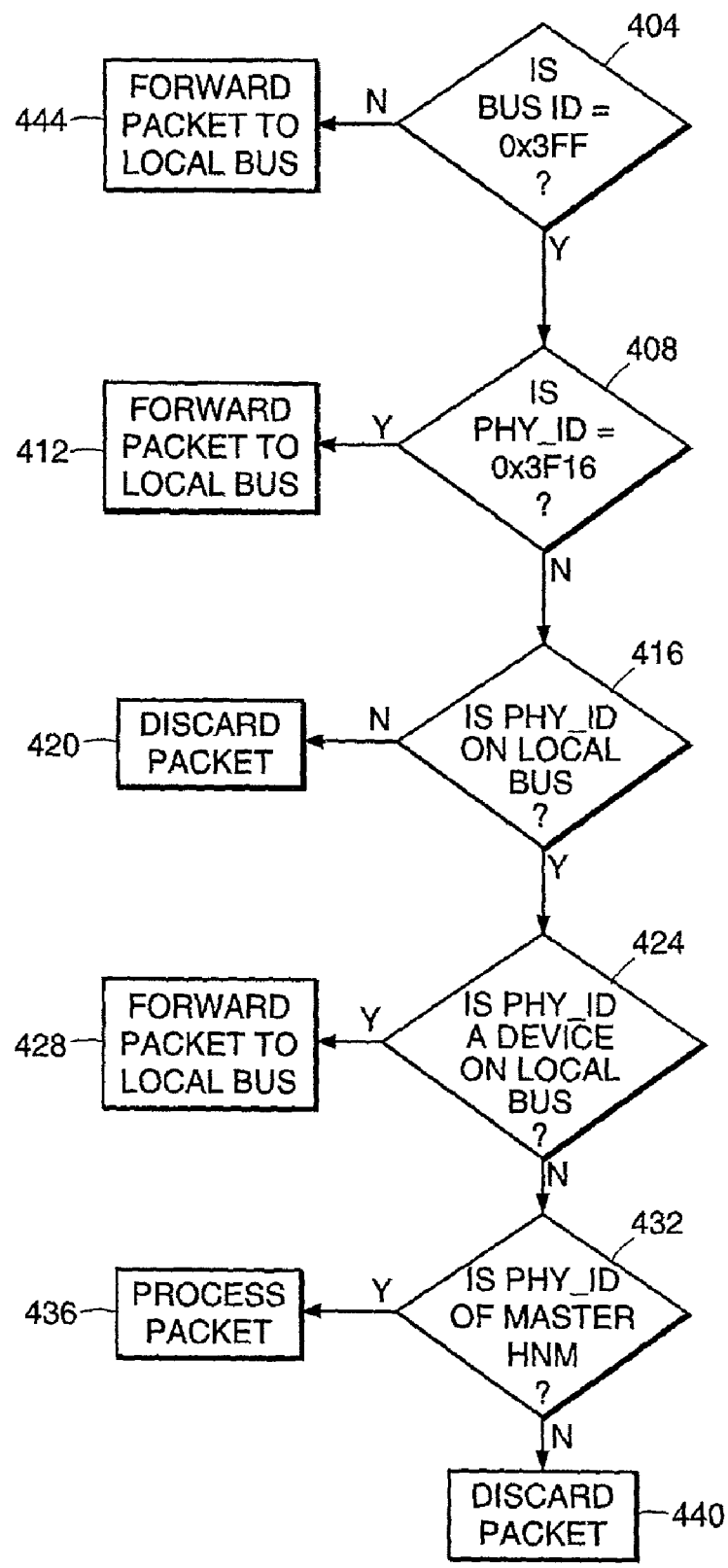
FIG. 15 is a flow diagram illustrating an embodiment of a process by which each home network module handles 1394 asynchronous packets received from a 1394 local bus in an emulated bus embodiment.

FIG. 15 shows an embodiment of a process for use by each HNM 28 when handling outbound asynchronous packets. For outbound asynchronous packets, each HNM 28 forwards such packets from the backbone 20 to the local bus 35 based on the physical ID destination address, the physical ID of the HNM 28, and the network table. If addressed to the address of the HNM 28, a packet passes to the HNM 28 only if the source of that packet is the master HNM 28 (a flag in the packet can indicate that the source of the packet is the master HNM 28).

In step 404, if the bus ID is equal to 0x3FF, the HNM 28 performs the following actions:

1. In step 408, if the Phy_ID is equal to 0x3F16, this indicates that the packet is a broadcast packet; if so, the HNM 28 forwards (step 412) the packet to the local bus.
2. In step 416, if the Phy_ID does not correspond to a node on the local bus, the HNM 28 discards (step 420) the packet.
3, In step 424, if the Phy_ID corresponds to a node on the local bus (but not the Phy_ID of the HNM 28), the HNM 28 forwards (step 428) the packet to the local bus.
4. In step 432, if the Phy_ID is that of the HNM 28, the HNM 28 processes (step 436) the packet if the HNM 28 is the master HNM 28, and discards (step 440) the packet if the HNM 28 is not the master HNM 28.

If the bus ID does not equal 0x3FF, the HNM 28 forwards (step 444) the packet to the local bus.

For isochronous streams, in one embodiment, each HNM 28 forwards to the local bus 35 those streams that are received from the backbone 20 and forwards to the backbone 20 those streams that are received from the local bus 35. The HNMs 28 forward the packets in these streams as the packets are received; that is, the HNMs 28 do not need to filter these packets.

Figure 16:
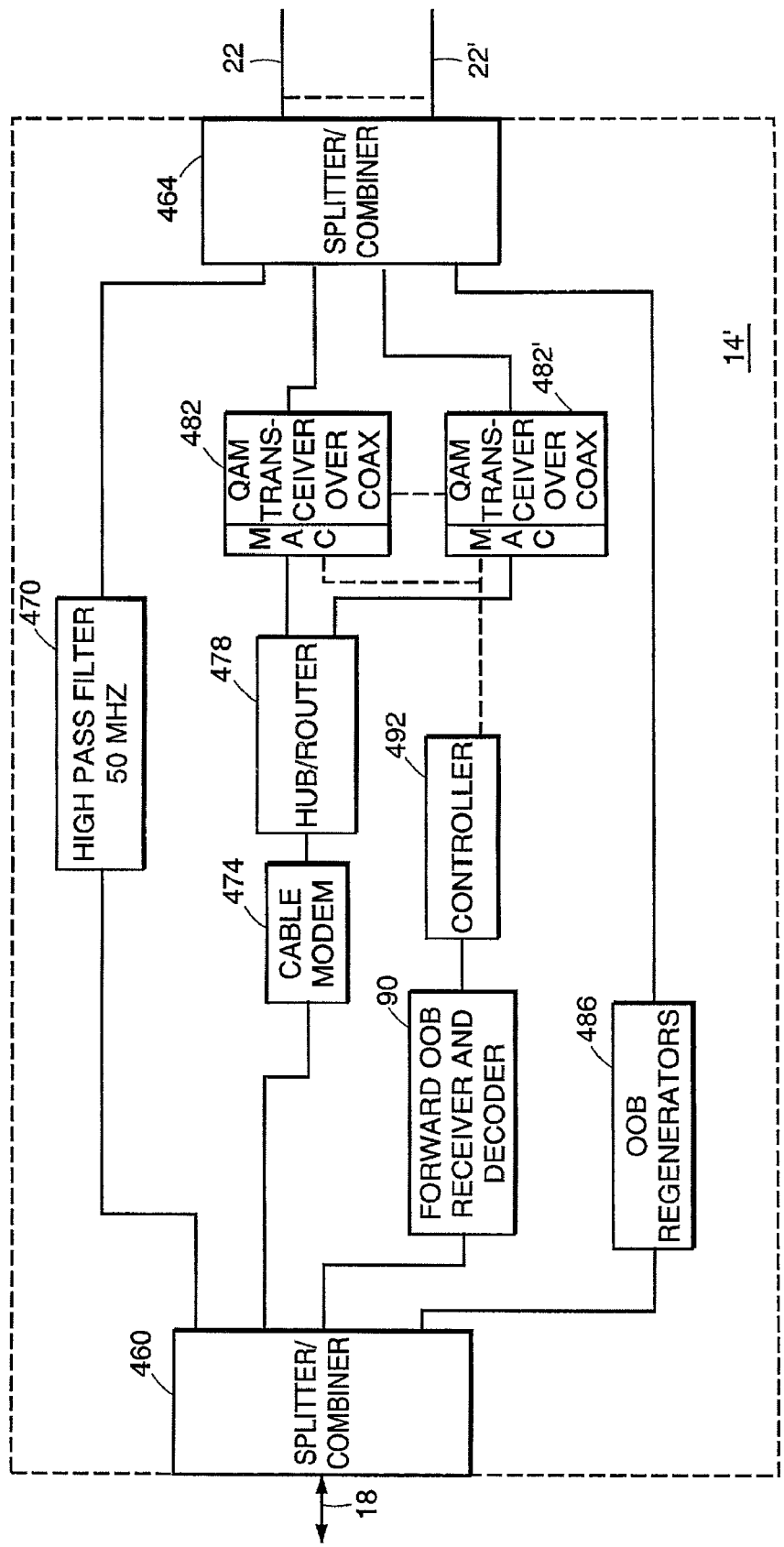
FIG. 16 is a block diagram of another embodiment of the demarcation point unit.

FIG. 16 shows another embodiment of the DPU 14' including a first splitter-combiner 460, which receives signals from and transmits signals to the cable television/internet network 18. The splitter-combiner 460 distributes those signals to the components of the DPU 14' from the cable television/internet network 18 and collects signals from the components of the DPU 14' for transmission to the cable television/internet network 18. Similarly a second splitter-combiner 464 receives signals from and transmits signals to the various rooms 30 through the coax cables 22. The splitter-combiner 464 distributes signals received from the various rooms 30 to the components of the DPU 14' and distributes signals from the components of the DPU 14' to the various rooms 30. The embodiment shown in FIG. 11 uses the frequency band of 5-45 Mhz for the home network signal, and the frequency band 50-850 MHz for the cable TV and Internet provider signals.

The components of the DPU 14' can be modified to achieve the other frequency bands described above for carrying the home network signal.

The components of this embodiment of the DPU 14' include a high-pass filter 470 connected between the first splitter combiner 460 and the second splitter combiner 464. The high-pass filter 470 allows the transparent connection of legacy TV cable network in the forward and reverse channels, while blocking the specific frequency channels that are allocated for the internal home network signal. In one embodiment, this high-pass filter 470 has a cut-off frequency of 50 MHz, thus permitting signals having a frequency greater than the 50 MHz high-pass cut-off to pass transparently between the splitter-combiners 460, 464. Signals above this frequency are typically legacy television signals (i.e., 55-850 MHz) and therefore should pass unimpeded through the DPU 14'. Frequencies lower than the cut-off are thus available for use by the home network signal.

The DPU 14' is responsible for allowing the RDC OOB and RDC CM signals to pass from the set top boxes and cable modems, respectively, to the head-end of the cable television network 18. To accomplish this, the DPU 14' includes a Forward OOB receiver and decoder 490 and a cable modem 474. The cable modem 474 and Forward OOB receiver 490 receive the data from the OOB Forward Data Channel and decode the signal to acquire information concerning which frequency is to be used as the RDC OOB and RDC CM channels. A controller 492 receives the OOB information, extracts the information on the current frequency bands that are being used in the home, and directs the home network 10 to use other frequency bands. After this frequency information is obtained, the DPU 14' controls the home network 10 so that no signals are transmitted on this OOB RDC and RDC CM frequency. A notch filter achieves this control, in one embodiment, by blocking passage of signals within the RDC OOB and RDC CM frequency region. In another embodiment, the corresponding tones of the multi-carrier signals are silenced. A regular multi-tone transmitter (either OFDM or DMT) determines whether to transmit power on each particular tone. Each tone can be silenced according to a management message from the controller 492. The controller 492 in the DPU 14' distributes this management message to each of the HNMs 28 identifying the tones that are to be silenced.

When a device 33 in the home needs to transmit data back to the head-end using the OOB RDC or RDC CM channel, the RDC signal is intercepted by the DPU 14' and transmitted to the cable television network 18. This is accomplished using an OOB regenerator (receiver/transmitter) 486. Signals received from the home devices 33 are down-converted and demodulated, then modulated and up-converted to the required transmitted frequency, and then transmitted to the cable television/internet network 18.

The cable modem (CM) 474 provides Internet access to the home. Other types of access modems are also available if the Internet access is provided on another media than the Cable networks (e.g. a DSL modem can be used if Internet access is provided on the telephone line network). For example, a digital subscriber line (DSL) modem replaces the cable modem 474 if a telephone network is providing Internet access. In such an embodiment, connection between the DPU 14' and the Internet 18 is not through the splitter-combiner 460, but instead is through another connector such as a RJ11 connector. An alternative embodiment includes the functionality of the cable modem in a set-top box located in the home (in which case, the cable modem 474 is not part of the DPU 14'). In yet another embodiment, the cable modem 474 is a standalone device (not in a set top box or in the DPU 14'. In this case, the cable modem 474 is connected to the backbone 20 through a HNM 28

In addition, the cable modem 474 is connected to a hub/router 478 for transmitting data to and from the Internet 18. The hub/router 478 (or bridge) provides hub and routing functionality that distributes the externally generated data signals (Internet) and the home network signal to the HNMs 28 in the home. The hub (or bridge) and routing functionality can be based on an interface such as 100-Base-T Ethernet, IEEE-1394, or USB. The signals from each output port of the hub/router are quadrature amplitude modulated (QAM) to produce QAM signals, with a programmable constellation size, over a pre-defined frequency range. As an example, with a 256-QAM modulation and a symbol rate of up to 40 MHz, the available throughput can reach up to 320 Mbps. A capability to notch filter the signal at programmable frequencies is also provided.

The QAM signal in various embodiments is either a single carrier QAM, or multi-band QAM, which is a summation of several QAM signals with different carrier frequencies. In another embodiment, the signal is modulated as a multi-carrier signal with approximately the same available throughput. The output-modulated signals are combined with the external cable TV signal stream and transmitted over the backbone 20 to the various rooms 30. A Media Access Controller (MAC) 482, 482' (generally 482), located between the hub/router functionality and the QAM or multi-tone modulators provides the functionality that allows the co-existence of several data sources over the same cable (networking), e.g. arbitration, signal detection, etc.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a home network having a plurality of network modules, each of said plurality of network modules being connected to a coax backbone, a method for communicating over the coax backbone between the plurality of network modules, the method comprising:
    configuring one of the plurality of network modules to be a master module;
    establishing direct communication between each of the plurality of network modules over the coax backbone;
    establishing direct communication between the master module and a demarcation point unit, said master module being coupled to the demarcation point unit via the coax backbone, said demarcation point unit providing an interface between the home network and an external network;
    using the master module to receive requests sent over the coax backbone from the plurality of network modules for bandwidth to transmit bursts, the master module being adapted for location in a home;
    establishing an order of transmission opportunities for the plurality of network modules to follow when transmitting bursts directly to other network modules via the coax backbone; and
    using the master module to transmit an allocation burst over the coax backbone that allocates a transmission opportunity to each of the plurality of network modules to transmit bursts directly to other network modules via the coax backbone, said transmission opportunity that depends at least in part on the amount of data ready for transmission in a selected transmission cycle, said allocation burst being based on said transmission order.

2. The method of claim 1 further comprising synchronizing the plurality of network modules to a predetermined burst transmitted by the master module.

3. The method of claim 1 further comprising allocating bandwidth to each of the plurality of network module requesting a guaranteed quality of service.

4. The method of claim 1 further comprising receiving over the backbone, at a selected network module, a grant signal that indicates that the given network module can transmit a burst.

5. The method of claim 1 further comprising transmitting, by a selected network module, an empty burst if the given network module has no data to transmit.

6. The method of claim 3 further comprising changing the amount of allocated bandwidth.

7. The method of claim 1 further comprising using the master module to change the order of transmission opportunities.

8. The method of claim 1 further comprising using the master module to change the order of transmission opportunities and to change the amount of allocated bandwidth.

9. The method of claim 1 further comprising using the master module to allocate an opportunity to a module involved in a registration process, said opportunity for transmitting a self-training burst.

10. A home network comprising:
    a coax backbone;
    a plurality of network modules, each of said plurality of network modules being connected to the coax backbone, each of said plurality of network modules being capable to be designated as a network master module, said plurality of network modules being in direct communication via at least one splitter with a demarcation point unit over the coax backbone, said demarcation point unit providing an interface between the home network and an external network; and
    the network master module being connected to the coax backbone and being adapted for location in a home, the master module that receives requests from the plurality of network modules over the coax backbone, the requests being for bandwidth to transmit bursts directly over the coax backbone to other network modules, the master module that establishes a transmission order of transmission opportunities for the plurality of network modules to follow when transmitting bursts to other network modules and that transmits a burst over the coax backbone that allocates a transmission opportunity to each of the plurality of network modules to transmit bursts, said burst being based on said transmission order, said transmission order being based at least in part on said received requests, wherein each of the plurality of network modules is configured to communicate with other network modules via the coax backbone and wherein a parameter of a transmission opportunity for a selected network module depends at least in part on an amount of data ready for transmission at the selected network module in a selected transmission cycle.

11. The network of claim 10 wherein, in response to a predetermined burst transmitted by the master module, the plurality of network modules are synchronized.

12. The network of claim 10 further comprising bandwidth allocated to each of the plurality of network module requesting a guaranteed quality of service.

13. The network of claim 10 further comprising a grant signal that indicates that a given network module can transmit a burst.

14. The network of claim 10 further comprising an empty burst associated with a selected network module that has communicated that the selected network module includes no data to transmit.

15. The network of claim 10 wherein the master module is adapted to change the order of transmission opportunities.

16. The network of claim 10 further comprising a self-training burst that is adapted to be received by a network module involved in a registration process.

17. An integrated circuit storing computer-executable instructions which, when executed by a processor on a computer system, perform a method, the method comprising:
    in a home network having a plurality of network modules, each of said plurality of network modules being connected to a coax backbone, said plurality of network modules communicating over the coax backbone, the communicating comprising:

establishing communication between two or more of the plurality of network modules over the coax backbone;

establishing communication between two or more of the plurality of the network modules and a demarcation point unit, said plurality of network modules being coupled to the demarcation point unit via the coax backbone, said demarcation point unit providing an interface between the home network and an external network;

designating one of the plurality of network modules as a network master module adapted for location in a home;

using the master module to receive requests sent over the coax backbone from the plurality of network modules for bandwidth to transmit bursts;

in response to receiving the requests, establishing an order of transmission opportunities for the each of the plurality of network modules to follow when transmitting bursts to other network modules; and using the master module to transmit an allocation burst over the coax backbone that allocates a transmission opportunity to each of the plurality of network modules to transmit bursts, said allocation burst being based on said transmission order, said transmission opportunity that depends at least in part on the amount of data ready for transmission in a selected transmission cycle.

18. The method of claim 17 further comprising synchronizing the plurality of network modules to a predetermined burst transmitted by the master module.

19. The method of claim 17 further comprising allocating bandwidth to each network module requesting a guaranteed quality of service.

20. The method of claim 17 further comprising receiving over the backbone, at a selected network module, a grant signal that indicates that the given network module can transmit a burst.

21. The method of claim 17 further comprising transmitting, by a selected network module, an empty burst if the given network module has no data to transmit.

22. The method of claim 19 further comprising changing the amount of allocated bandwidth.

23. The method of claim 17 further comprising using the master module to change the order of transmission opportunities.

24. The method of claim 17 further comprising using the master module to change the order of transmission opportunities and to change the amount, of allocated bandwidth.

25. The method of claim 17 further comprising using the master module to allocate an opportunity to a module involved in a registration process, said opportunity for transmitting a self-training burst.

* * * * *